(12) United States Patent
Miyamoto et al.

(10) Patent No.: US 7,867,298 B2
(45) Date of Patent: Jan. 11, 2011

(54) REACTING APPARATUS COMPRISING A PLURALITY OF REACTORS

(75) Inventors: Naotomo Miyamoto, Tokyo (JP); Kaoru Saito, Shiki (JP); Tadao Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 310 days.

(21) Appl. No.: 12/079,154

(22) Filed: Mar. 25, 2008

(65) Prior Publication Data

US 2008/0241020 A1 Oct. 2, 2008

(30) Foreign Application Priority Data

Mar. 27, 2007 (JP) .............................. 2007-082105

(51) Int. Cl.
*B01J 8/00* (2006.01)
(52) U.S. Cl. .......................... 48/61; 48/127.9; 422/211; 422/198; 422/188; 422/189; 422/187; 422/190
(58) Field of Classification Search ............... 48/61, 48/127.9; 422/198, 211, 187, 188, 190, 193–194; 429/19–20
See application file for complete search history.

(56) References Cited

U.S. PATENT DOCUMENTS 6,485,852 B1   11/2002   Miller et al.

(Continued)

FOREIGN PATENT DOCUMENTS

| CN | 1511062 A | 7/2004 |
| JP | 2003-089504 A | 3/2003 |
| JP | 2004-006265 A | 1/2004 |
| JP | 2004-296349 A | 10/2004 |
| JP | 2005-259354 A | 9/2005 |

(Continued)

OTHER PUBLICATIONS

U.S. Appl. No. 11/646,030, filed Dec. 27, 2006. First named inventor Osamu Nakamura. Title: Reaction Device, Heat-Insulating Container, Fuel Cell Device, and Electronic Apparatus.

(Continued)

*Primary Examiner*—Alexa D. Neckel
*Assistant Examiner*—Kaity V. Handal
(74) *Attorney, Agent, or Firm*—Holtz, Holtz, Goodman & Chick, PC

(57) ABSTRACT

Disclosed is a micro-reactor module including: a high temperature reactor which causes a reaction of a reactant; and a low temperature reactor which causes a reaction of a reactant at a lower temperature than the high temperature reactor, wherein a material of infrared reflecting film is set so that an infrared reflectance of the high temperature reactor is higher than an infrared reflectance of the low temperature reactor. Consequently, heat radiation of a plurality of reactors set to different temperatures is suppressed and the difference in temperatures between the plurality of reactors is maintained.

6 Claims, 16 Drawing Sheets

U.S. PATENT DOCUMENTS

| | | |
|---|---|---|
| 6,797,022 B1 | 9/2004 | Docter et al. |
| 2004/0043263 A1 | 3/2004 | Takeyama et al. |
| 2004/0148858 A1* | 8/2004 | Yamamoto et al. ......... 48/127.9 |
| 2004/0191591 A1 | 9/2004 | Yamamoto |
| 2005/0191534 A1 | 9/2005 | Kim et al. |
| 2007/0151151 A1* | 7/2007 | Nakamura et al. ............. 48/61 |

FOREIGN PATENT DOCUMENTS

| | | |
|---|---|---|
| JP | 2005-314207 A | 11/2005 |

OTHER PUBLICATIONS

Chinese Office Action dated Jul. 11, 2008 and English translation thereof issued in Chinese Application No. 200610172706, a Chinese counterpart of related U.S. Appl. No. 11/646,030.

Japanese Office Action dated Aug. 5, 2008, and English translation thereof, issued in Japanese Application No. 2006-338222, a Japanese counterpart of related U.S. Appl. No. 11/646,030.

* cited by examiner

REACTING APPARATUS COMPRISING A PLURALITY OF REACTORS

BACKGROUND OF THE INVENTION

1. Field of the Invention

The present invention relates to a reacting apparatus comprising a plurality of reactors.

2. Description of the Related Art

Recently, as a clean power source with high energy conversion efficiency, fuel cells which use hydrogen as fuel are starting to be applied in vehicles, portable devices, etc. A fuel cell is a device which causes an electrochemical reaction of fuel and oxygen in the air to directly obtain electric energy from chemical energy.

The problem with hydrogen used as fuel in fuel cells is since hydrogen is a gas at room temperature, it is difficult to handle and store. When using liquid fuel such as alcohols and gasoline, a vaporizer for vaporizing the liquid fuel, a reformer for obtaining the hydrogen necessary for power generating by causing a reaction of liquid fuel and high temperature water vapor, and a carbon monoxide remover for removing carbon monoxide which is a by-product of a reforming reaction are necessary.

Since operating temperatures of the vaporizer and the carbon monoxide remover are high, these are stored in a heat insulating container and heat dissipation is suppressed. Also a reflective film to reflect infrared rays (wave length 0.7 µm to 1 mm) are formed on an inner wall surface of the heat insulating container to reduce thermal energy loss to the outside (for example, Japanese Patent Application Laid-Open Publication No. 2004-6265).

The operating temperature of the vaporizer and the carbon monoxide remover is for example, less than about 100° C. to 180° C. whereas the operating temperature of the reformer is for example, no less than about 300° C. to 400° C. Since there is a significant difference in the temperatures, there is a large amount of heat transfer due to radiation from the reformer. The heat propagation from the reformer causes a rise in temperature in the vaporizer and the carbon monoxide remover, and it was difficult to maintain the difference in temperature in the reforming apparatus.

The present invention has been made in consideration of the above situation and it is a main object to provide a reacting apparatus which suppresses the heat radiation of a plurality of reactors set to different temperatures and easily maintains the difference in temperatures among the plurality of reactors.

SUMMARY OF THE INVENTION

The present invention has been made in consideration of the above situation, and in a reacting apparatus has an advantage of suppressing heat radiation of a plurality of reactors set to different temperatures and the difference in temperatures between the plurality of reactors is maintained.

In order to achieve any one of the above advantages, a preferred embodiment of the present invention comprises:

a high temperature reactor which causes a reaction of a reactant; and a low temperature reactor which causes a reaction of a reactant at a lower temperature than the high temperature reactor, wherein an infrared reflectance of the high temperature reactor is higher than an infrared reflectance of the low temperature reactor.

BRIEF DESCRIPTION OF THE DRAWINGS

The present invention and the above-described objects, features and advantages thereof will become more fully understood from the following detailed description with the accompanying drawings and wherein.

DETAILED DESCRIPTION OF THE PREFERRED EMBODIMENTS

A preferred embodiment of the present invention will be described in detail with reference to the drawings. The embodiments described below include various technically preferable limitations for carrying out the present invention, however, the scope of the invention is not limited to the embodiments and the illustrated examples.

Figure 1:
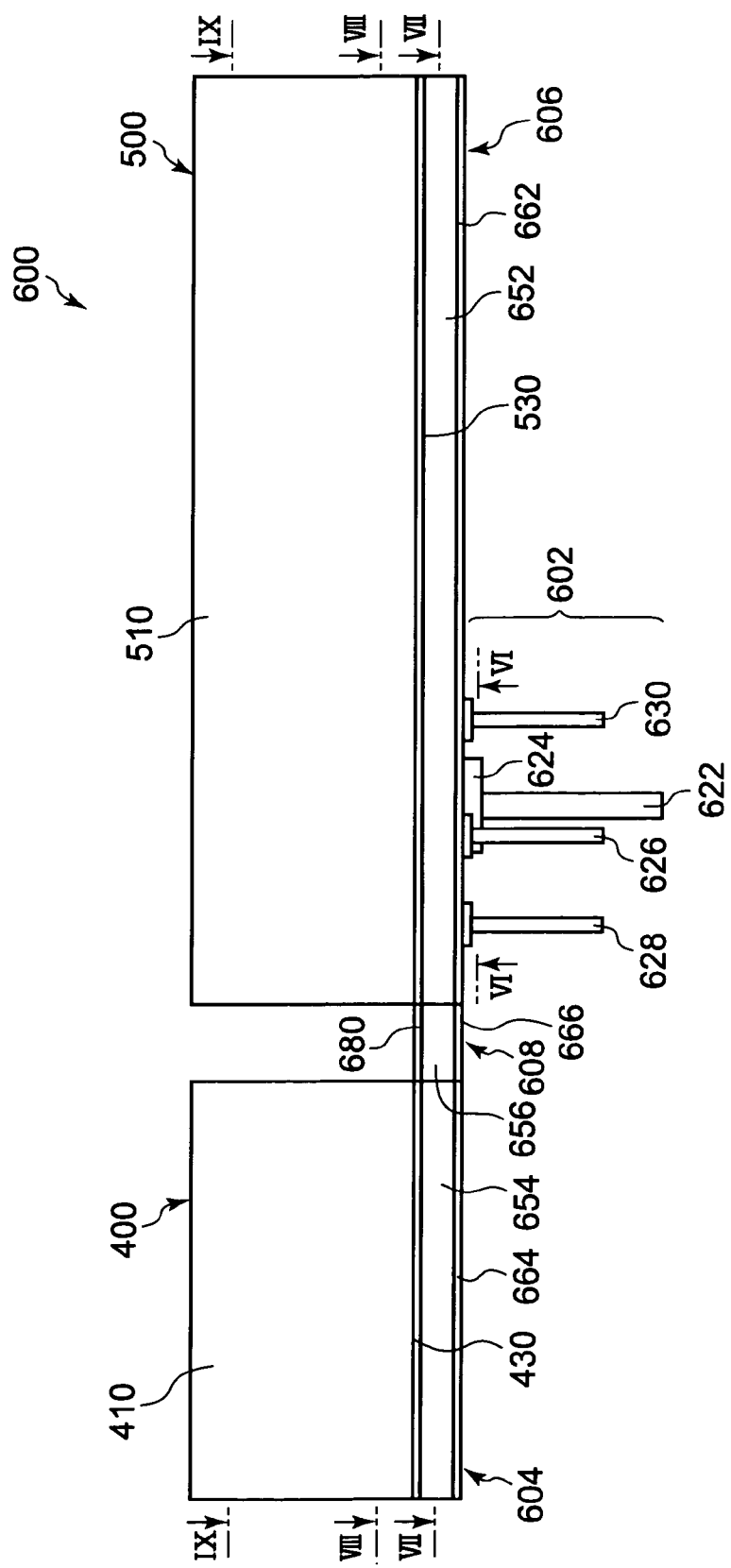
FIG. 1 is a side view showing a micro-reactor module 600.

FIG. 1 is a side view showing a micro-reactor module 600. This micro-reactor module 600 is included in an electronic device such as a laptop personal computer, PDA, computerized personal organizer, digital camera, cellular phone, watch, register, or projector and generates hydrogen gas used in fuel cells.

As shown in FIG. 1, this micro-reactor module 600 comprises a pipe group 602 for supplying a reactant and discharging a product, a high temperature reactor 604 in which an appropriate temperature necessary for operation is high and where a reforming reaction occurs, a low temperature reactor 606 in which an appropriate operation temperature is lower than the appropriate operation temperature of the high temperature reactor 604 and where a selective oxidation reaction occurs, and a coupling section 608 for flowing in or out the reactant and the product between the high temperature reactor 604 and the low temperature reactor 606.

Figure 2:
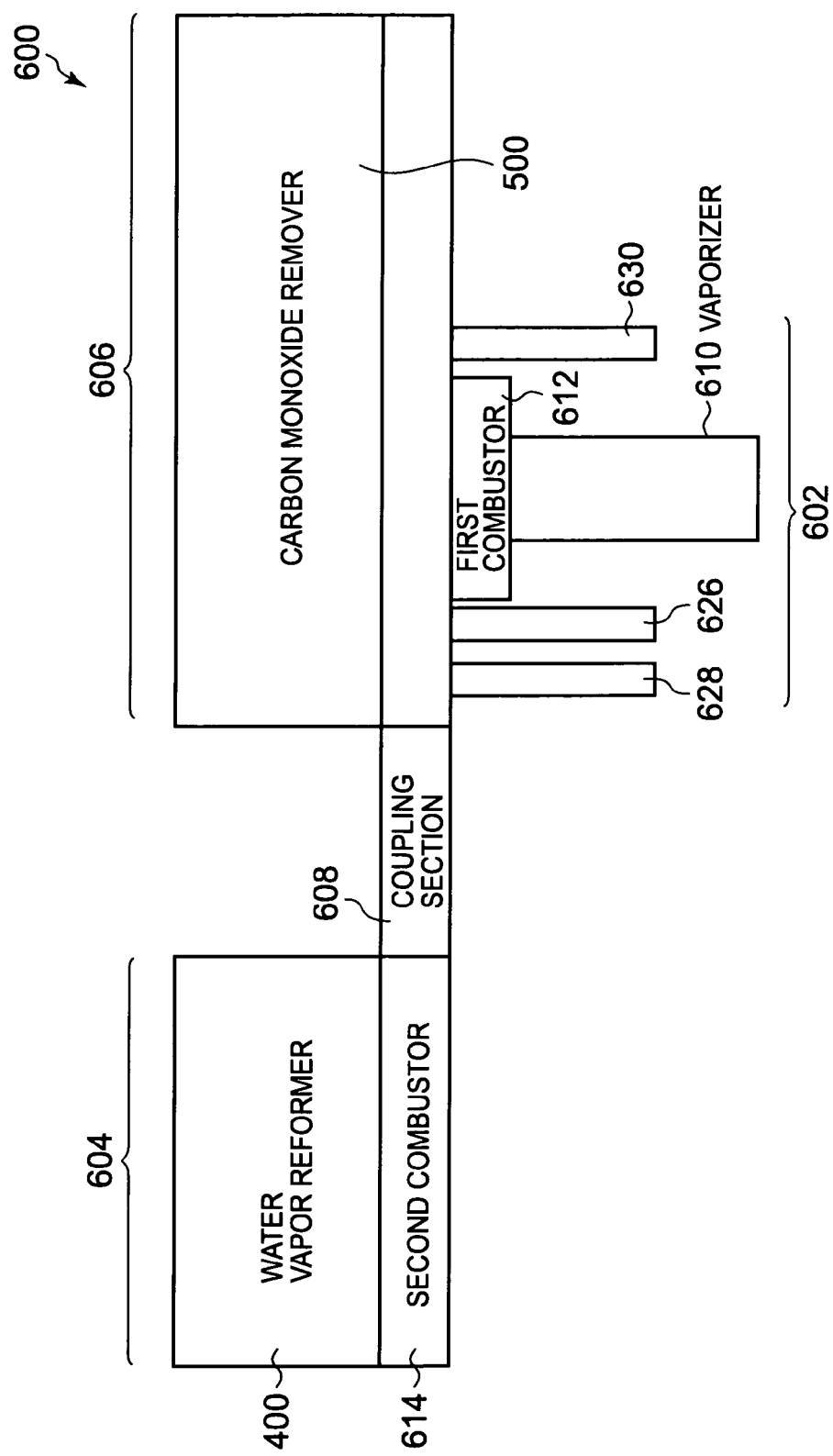
FIG. 2 is a side view schematically showing the micro-reactor module 600 according to function.

FIG. 2 is a side view schematically showing the micro-reactor module 600 according to function. As shown in FIG. 2, mainly a vaporizer 610 and a first combustor 612 are provided in the pipe group 602. In the first combustor 612, a fuel where at least a portion is vaporized (for example, hydrogen gas, methanol gas, etc.) and a gas which is a source of oxygen such as air which includes oxygen for combusting this fuel are supplied as a separate or mixed fluid and these fluids are combusted with a catalyst in the first combustor 612 to generate heat. In the vaporizer 610, water and liquid fuel (for example, alcohols such as methanol, ethanol, etc., ethers such as dimethyl ether, etc., or fossil fuels such as gasoline, etc.) are supplied to a fuel container separately or in a mixed state and a propagation of the combustion heat of the first combustor 612 to the vaporizer 610 vaporizes the water and liquid fuel in the vaporizer 610.

A second combustor 614 and a reformer 400 provided on the second combustor 614 are provided in the high temperature reactor 604. In the second combustor 614, a fuel where at least a portion is vaporized (for example, hydrogen gas, alcohols such as methanol, ethanol, etc., ethers such as dimethyl ether, etc., or fossil fuels such as gasoline, etc.) and a gas which is a source of oxygen such as air which includes oxygen for combusting this fuel are supplied as a separate or mixed fluid and a catalytic combustion of the fluid generates heat.

When an electrochemical reaction occurs in the fuel cell with the hydrogen gas supplied from the micro-reactor module 600, unreacted hydrogen gas may be included in an offgas discharged from the fuel cell, and at least one of the first combustor 612 and the second combustor 614 may combust the unreacted hydrogen gas with the gas such as air including oxygen and generate heat. Of course, at least one of the first combustor 612 and the second combustor 614 may vaporize the liquid fuel (for example, methanol, ethanol, butane, dimethyl ether, gasoline, etc.) stored in the fuel container with a separate vaporizer and combust the vaporized fuel with the gas such as air including oxygen.

When the second combustor 614 combusts the offgas discharged from the fuel cell, first at startup the reformer 400 is heated with a later-described electrical heating wire 722 to generate hydrogen, then when the fuel cell from where this hydrogen is supplied steadily discharges offgas including hydrogen, the second combustor 614 combusts the hydrogen in the offgas and heats the reformer 400. When the second combustor 614 becomes a main heat source, the applied voltage is lowered so that the electrical heating wire 722 switches to an auxiliary heat source.

The mixture gas of water and fuel is supplied from the vaporizer 610 to this reformer 400 and the reformer 400 is heated to a predetermined temperature by the second combustor 614. In the heated reformer 400, hydrogen gas, etc. is generated with a catalytic reaction from water and fuel, and trace amounts of carbon monoxide gas are also generated. When the fuel is methanol, a chemical reaction shown in the following formulas (1) and (2) occur. The reaction where hydrogen is generated is an endothermic reaction and the combustion heat of the second combustor 614 is used.

$$CH_3OH + H_2O \rightarrow 3H_2 + CO_2 \quad (1)$$

$$2CH_3OH + H_2O \rightarrow 5H_2 + CO + CO_2 \quad (2)$$

A carbon monoxide remover 500 is mainly provided in the low temperature reactor 606. The carbon monoxide remover 500 heated by the first combustor 612 is supplied with a gas mixture including hydrogen gas, carbon monoxide gas, etc., from the reformer 400 and an oxygen source such as air, etc., is also supplied. In the carbon monoxide remover 500, the carbon monoxide in the gas mixture is selectively oxidized, and a chemical reaction shown in the following formula (3) occurs to remove the carbon monoxide.

$$CO + \tfrac{1}{2}O_2 \rightarrow CO_2 \quad (3)$$

The gas mixture mainly including hydrogen in a state where the carbon monoxide is removed is supplied to the fuel electrode of the fuel cell.

In the present embodiment, an infrared reflectance of the high temperature reactor 604 is higher than the infrared reflectance of the low temperature reactor 606, and this is explained with reference to FIG. 1, FIG. 3 to FIG. 9 along with the specific structure of the micro-reactor module 600.

Figure 3:
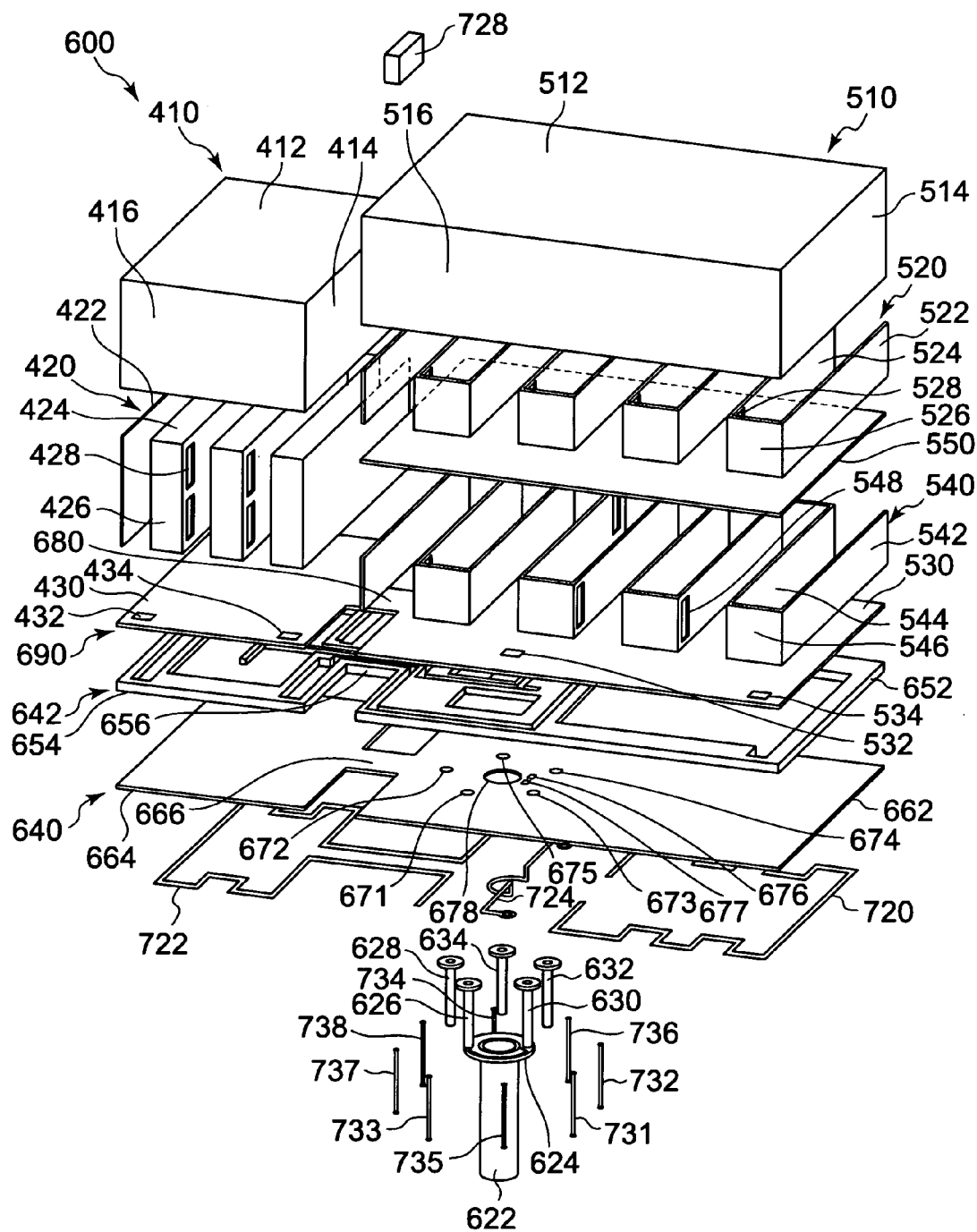
FIG. 3 is an exploded perspective view showing the micro-reactor module 600.
Figure 4:
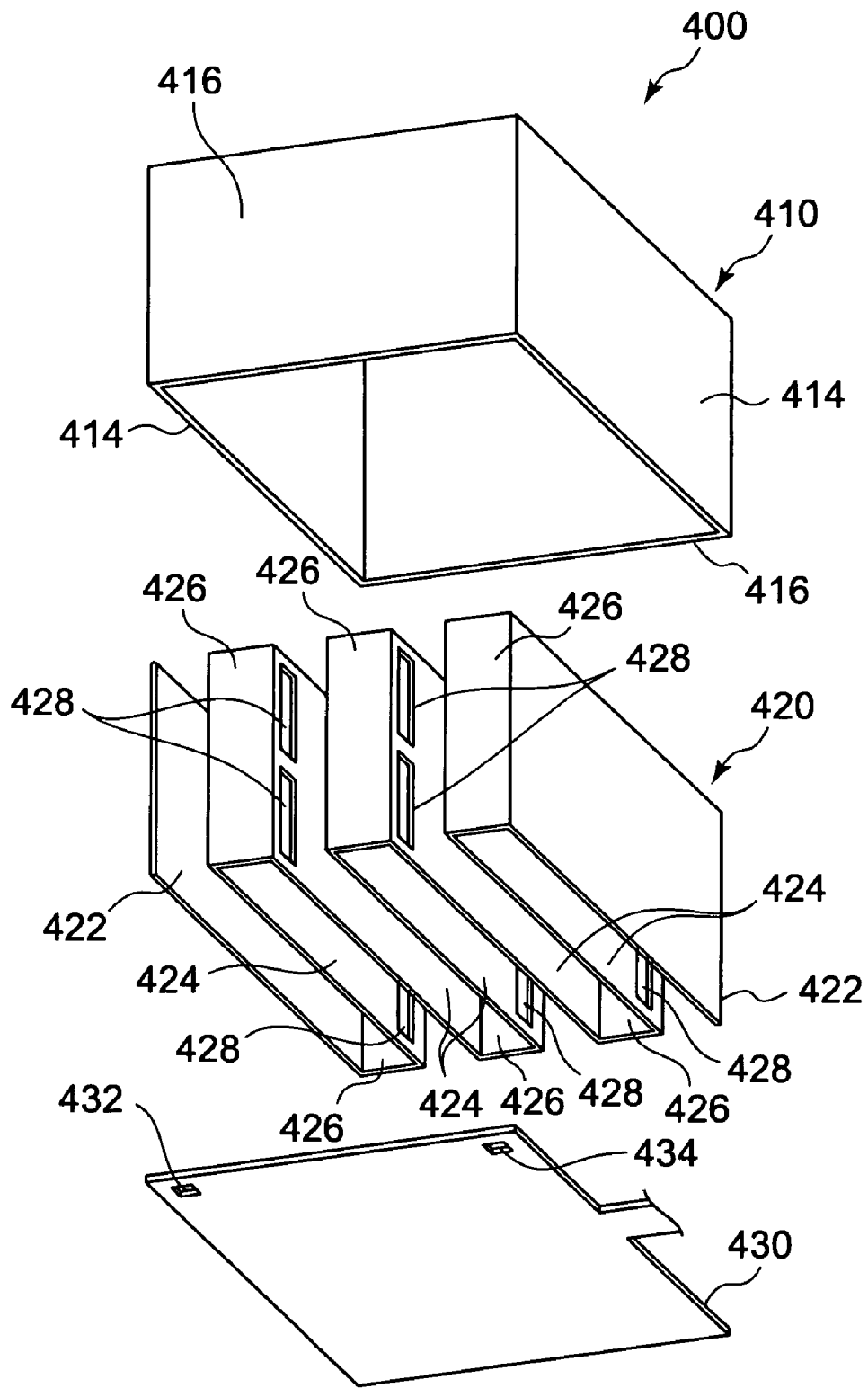
FIG. 4 is an exploded perspective view showing a reformer 400.
Figure 5:
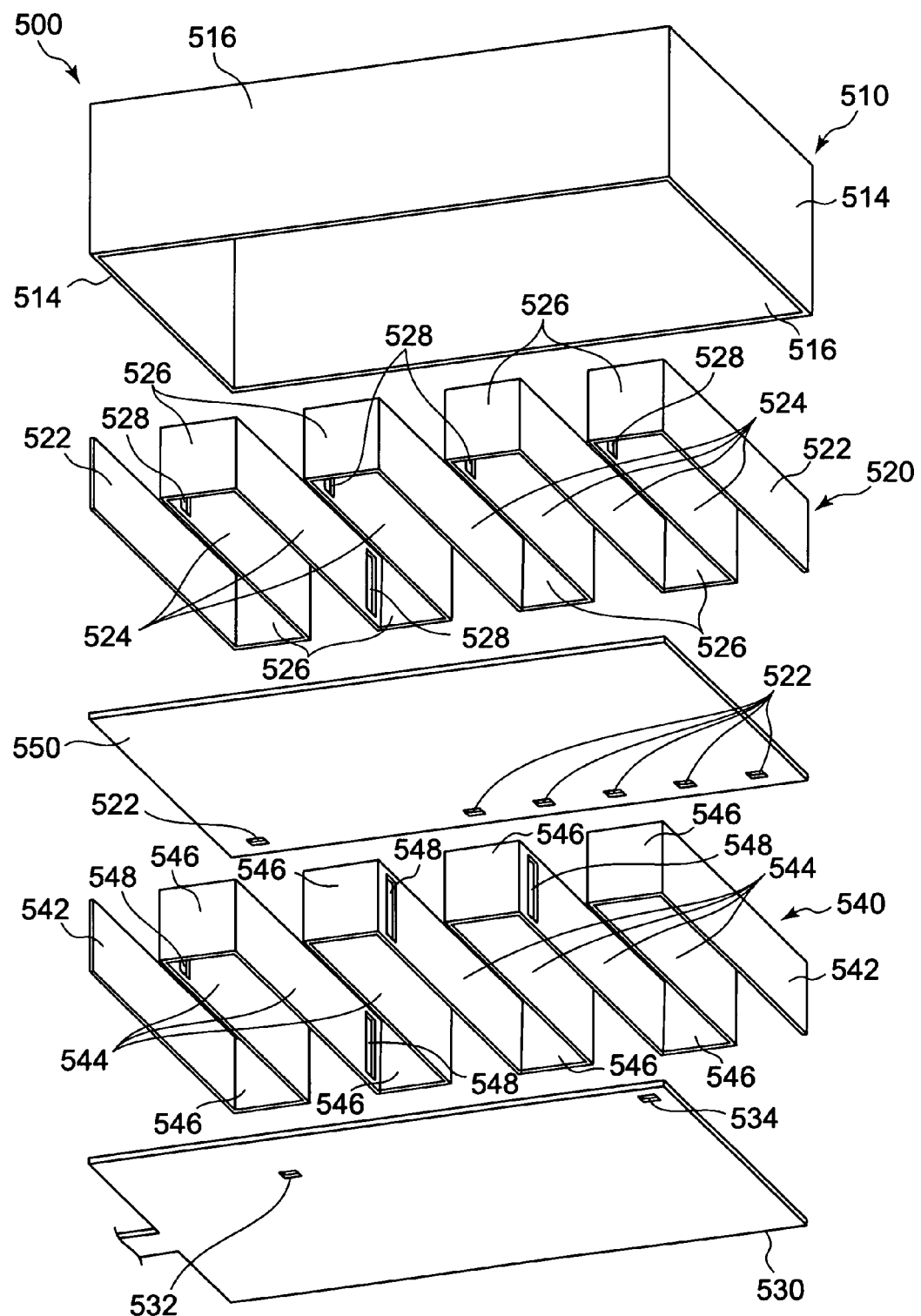
FIG. 5 is an exploded perspective view showing a carbon monoxide remover 500.
Figure 6:
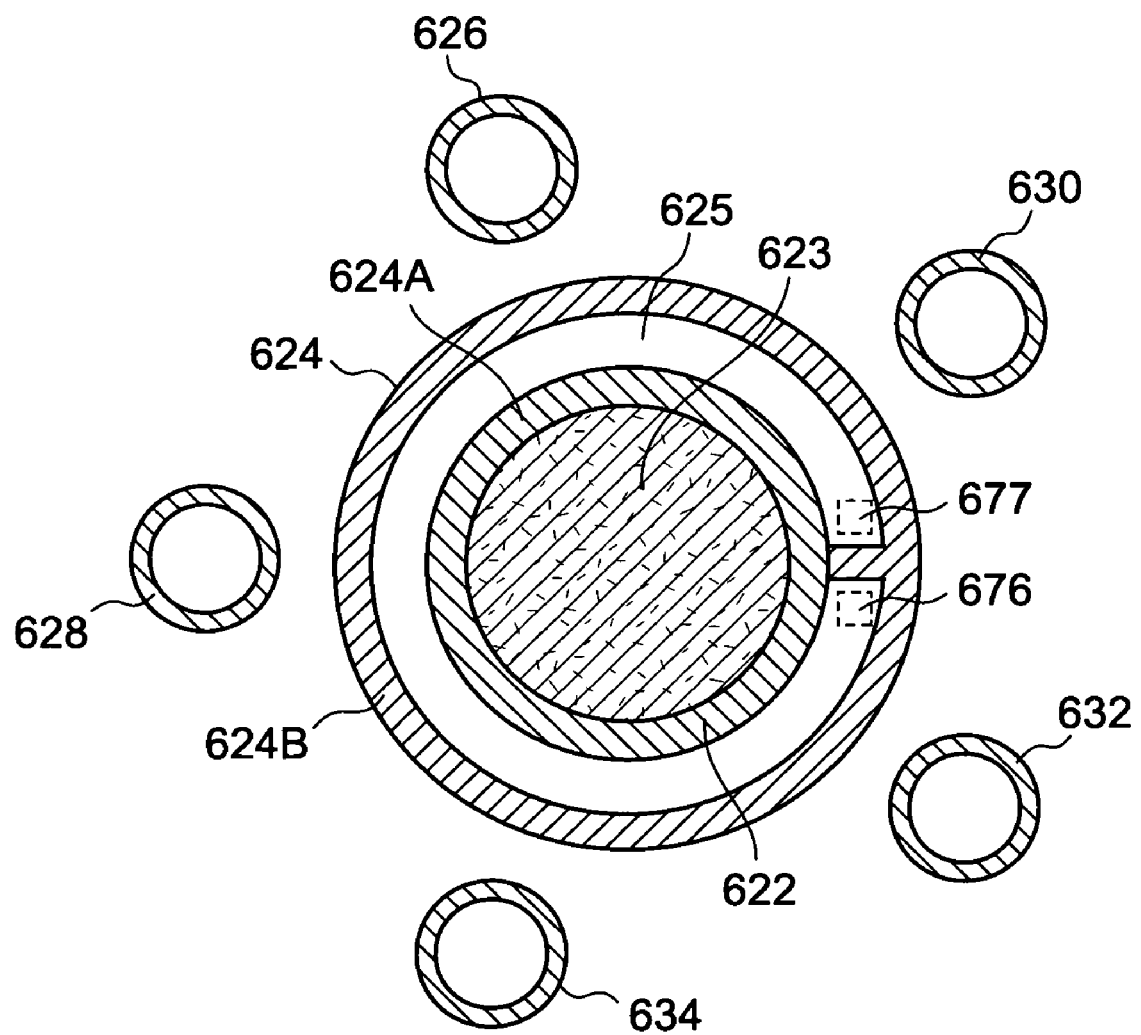
FIG. 6 is a cross-sectional view taken along arrows VI-VI shown in FIG. 1.
Figure 7:
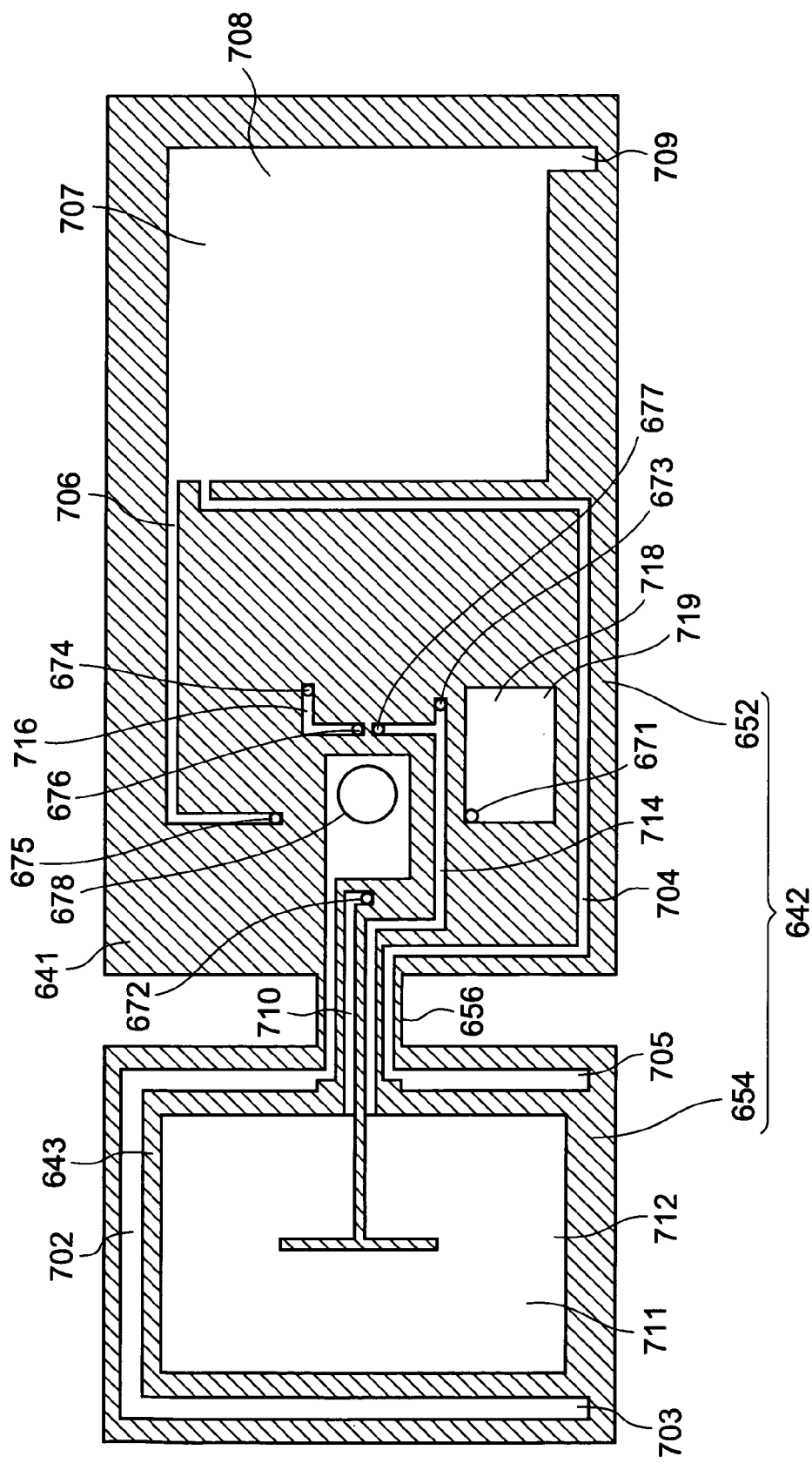
FIG. 7 is a cross-sectional view taken along arrows VII-VII shown in FIG. 1.
Figure 8:
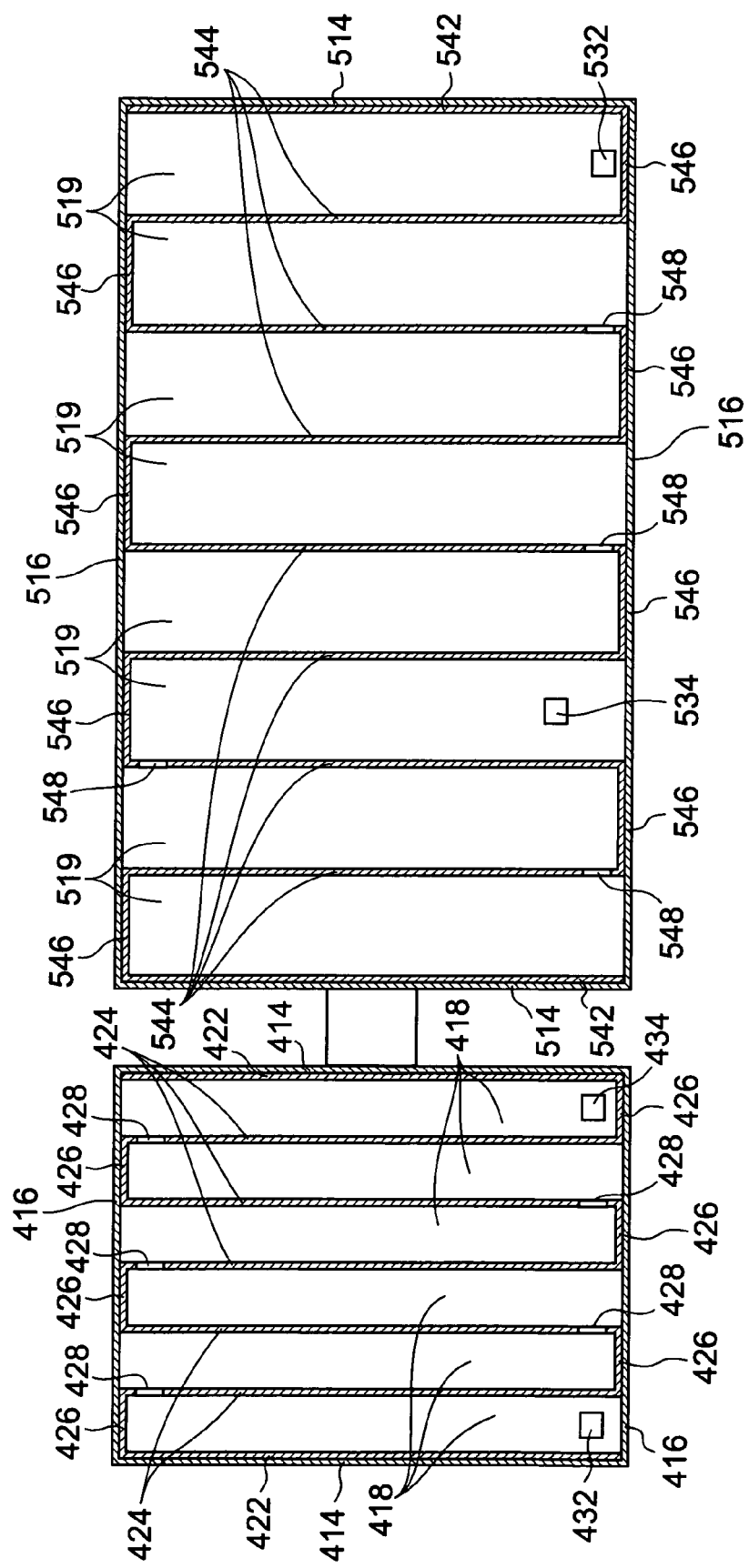
FIG. 8 is a cross-sectional view taken along arrows VIII-VIII shown in FIG. 1.
Figure 9:
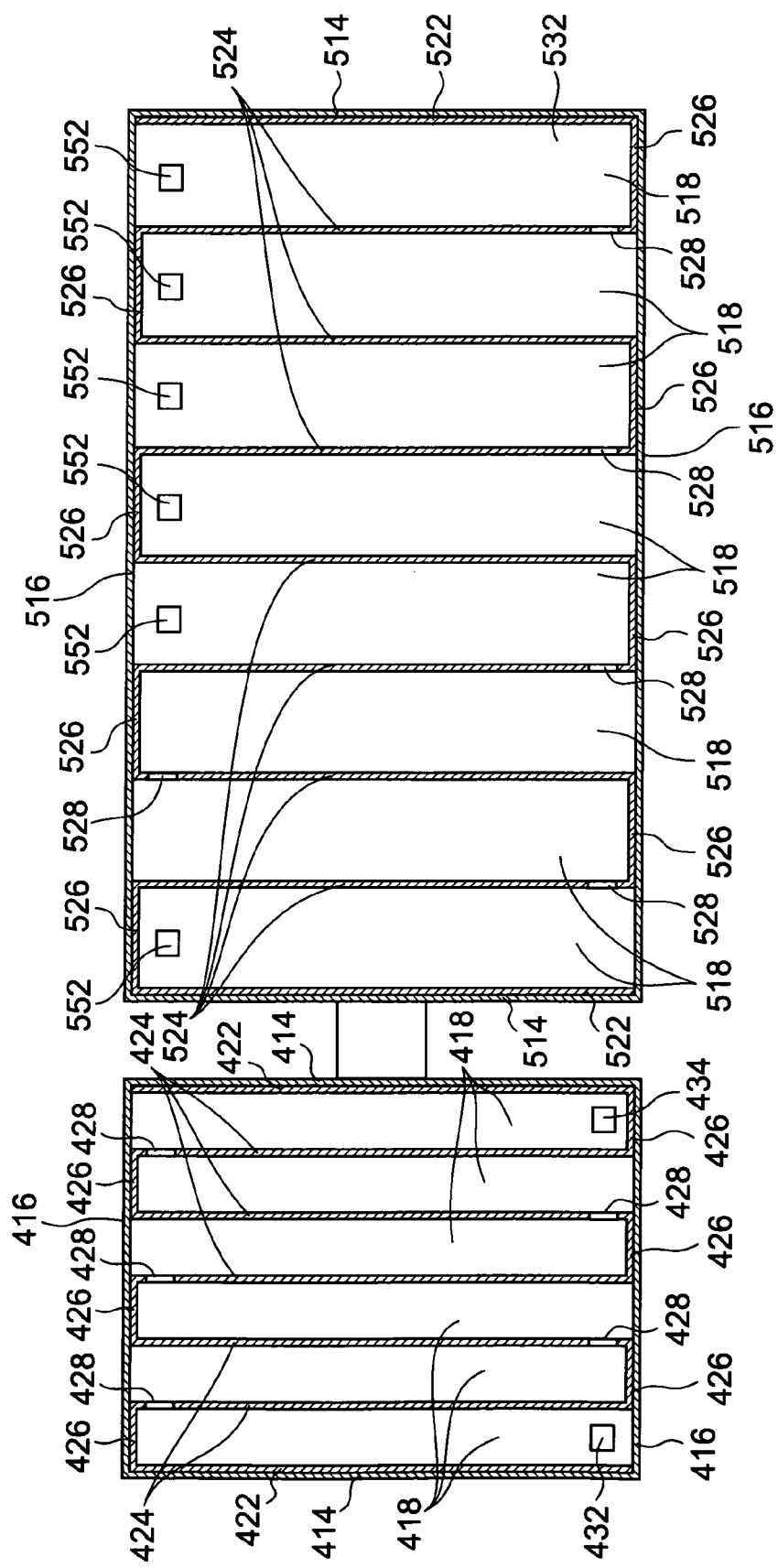
FIG. 9 is a cross-sectional view taken along arrows IX-IX shown in FIG. 1.

FIG. 3 is an exploded perspective view showing the micro-reactor module 600, FIG. 4 is an exploded perspective view showing the reformer 400, FIG. 5 is an exploded perspective view showing the carbon monoxide remover 500, FIG. 6 is a cross-sectional view taken along arrows VI-VI shown in FIG. 1, FIG. 7 is a cross-sectional view taken along arrows VII-VII shown in FIG. 1, FIG. 8 is a cross-sectional view taken along arrows VIII-VIII shown in FIG. 1, and FIG. 9 is a cross-sectional view taken along arrows IX-IX shown in FIG. 1.

As shown in FIG. 1, FIG. 3, and FIG. 6, the pipe group 602 comprises, a liquid fuel introducing pipe 622 including kovar (NiFeCo alloy), a combustor plate 624 including kovar (NiFeCo alloy) provided so as to surround the liquid fuel introducing pipe 622 at the top end, and five pipe materials 626, 628, 630, 632 and 634 including kovar (NiFeCo alloy) arranged around the liquid fuel introducing pipe 622. The combustor plate 624 is joined to the liquid fuel introducing pipe 622 and the low temperature reactor 606 by hard brazing. The brazing filler metal has a melting point higher than the maximum temperature of the fluid which flows through the liquid fuel introducing pipe 622 and the combustor plate 624, preferably no lower than 700 degrees. A brazing filler gold comprising gold, silver, copper, zinc and cadmium, a brazing filler metal comprising mainly of gold, silver, zinc and nickel or a brazing filler metal comprising mainly of gold, palladium, and silver are especially preferable. The combustor plate 624 functions as a flange to join the liquid fuel introducing pipe 622 to the low temperature reactor 606.

The liquid fuel introducing pipe 622 is filled with liquid absorbing material 623. The liquid absorbing material 623 absorbs liquid. Material for the liquid absorbing material 623 may include for example, inorganic fiber or organic fiber hardened by joining material, inorganic powder sintered or hardened by joining material, or a mixture of graphite and glassy carbon. Specifically felt material, ceramic porous material, fiber material, or carbon porous material may be used as liquid absorbing material 623.

A through hole is formed in a central portion 624A of the combustor plate 624 and the liquid fuel introducing pipe 622 is fitted in the through hole 624A and the liquid fuel introducing pipe 622 and the combustor plate 624 are joined. One face of the combustor plate 624 is provided with a protruding partition wall 624B. A portion of the partition wall 624B is provided around the entire circumference of the outer end of the combustor plate 624 and another portion is provided in a radial direction so that when the combustor plate 624 is joined to the bottom surface of the low temperature reactor 606, a combustion flow path 625 is formed on the joint surface and the liquid fuel introducing pipe 622 is surrounded by the combustion flow path 625. A combustion catalyst for causing combustion of the combustion mixture gas is supported on the wall surface of the combustion flow path 625. Platinum is an example of the combustion catalyst. The liquid absorbing material 623 in the liquid fuel introducing pipe 622 is filled to the location of the combustor plate 624.

As shown in FIG. 1 and FIG. 3, the high temperature reactor 604, the low temperature reactor 606 and the coupling section 608 share a base plate 642 as a common substrate. On one face of the base plate 642 a plate material 690, corrugated plates 420, 520, and 540, a separating plate 550 and cups 410, 510 are provided to form a reacting container such as high temperature reactor 604, low temperature reactor 606 and coupling section 608. An insulating plate 640 is provided on the other face of the base plate 642 forming this reacting container.

The base plate 642 includes kovar (NiFeCo alloy) and comprises a base section 652 which is a substrate of the low temperature reactor 606, a base section 654 which is a substrate of the high temperature reactor 604, and a coupling base section 656 which is a substrate of the coupling section 608. The base section 652, the base section 654 and the coupling base section 656 integrally form the base plate 642, and the base plate 642 is constricted at the coupling base section 656.

The insulating plate 640 comprises a base section 662 which is a substrate of the low temperature reactor 606, a base section 664 which is a substrate of the high temperature reactor 604, and a coupling base section 666 which is a substrate of the coupling section 608. The base section 662, the base section 664 and the coupling base section 666 integrally form the insulating plate 640 and the insulating plate 640 is constricted at the coupling base section 666. The insulating plate 640 includes an electric insulating material such as ceramics, etc.

It is preferable that a linear expansion coefficient of the electric insulating material included in the insulating plate 640 is the linear expansion coefficient of the metal material included in the reacting container such as the cups 410, 510, the corrugated plates 420, 520, 540, the separating plate 550, the plate material 690, the base plate 642, etc., which is 70% to 130%, it is more preferable that it is 90% to 100%, and it is most preferable that it is equal.

As for electric insulating material which is to be the above-described insulating plate 640 and a reacting container material which is to be a base plate 642 in contact with the insulating plate 640, a combination of for example, mullite as the electric insulating material ($3Al_2O_3 \cdot 2SiO_2$, linear expansion coefficient $5.0 \times 10^{-6}/°C$.) and kovar as the reacting container material (FeNiCo alloy, linear expansion coefficient $5.16 \times 10^{-6}/°C$.) may be included but it is not limited to this combination.

As shown in FIG. 3 and FIG. 7, the base plate 642 and the insulating plate 640 are joined and the through holes 671 to 678 penetrate the base section 652 of the base plate 642 and the base section 662 of the insulating plate 640. As shown in FIG. 1 and FIG. 3, the base section 662 of the insulating plate 640 is the bottom surface section of the low temperature reactor 606 and the flange sections of the pipe material 626, 628, 630, 632, and 634 and the liquid fuel introducing pipe 622 are joined to the bottom surface of the low temperature reactor 606. Here, the pipe material 626 connects to the through hole 671, the pipe material 628 connects to the through hole 672, the pipe material 630 connects to the through hole 673, the pipe material 632 connects to the through hole 674, the pipe material 634 connects to the through hole 675 and the liquid fuel introducing pipe 622 connects to the through hole 678. As shown in FIG. 3, FIG. 6 and FIG. 7, the combustor plate 624 is joined to the bottom surface of the low temperature reactor 606 and one end of the combustion flow path 625 of the combustor plate 624 connects to the through hole 676 and the other end of the combustion flow path 625 connects to the through hole 676.

As shown in FIG. 7, on one face of the base plate 642 a stage 641 and a stage 643 are provided on the base section 652 and the base section 654 respectively, and the stages are raised to form grooves for reforming fuel supplying flow path 702, communicating flow path 704, air supplying flow path 706, mixing chamber 708, combustion fuel supplying flow path 710, combustion chamber 712 which is to be the second combustor 614, discharging gas flow path 714, combustion fuel supplying flow path 716 and discharging chamber 718.

The reforming fuel supplying flow path 702 is formed from the through hole 678 of the low temperature reactor 606 through the coupling base section 656 of the coupling section 608 to the corner of the base section 654 of the high temperature reactor 604.

The communicating flow path 704 is formed from the corner of the base section 654 of the high temperature reactor 604 through the coupling base section 656 to the mixing chamber 708. The air supplying flow path 706 is formed from the through hole 675 of the low temperature reactor 606 to the mixing chamber 708. The air supplying flow path 706 is formed from the through hole 757 of the low temperature reactor 606 to the joining section of the mixing chamber 708 and the communicating flow path 704.

The combustion chamber 712 is formed in the central portion of the base section 654 with a C-shaped bottom surface 711. The wall surface of the combustion chamber 712 including the bottom surface of the plate material 690 and the top surface of the bottom plate 711 are supported with combustion catalyst for causing combustion of the combustion mixture gas.

The combustion fuel supplying flow path 710 is formed from the through hole 672 through the coupling base section 656 to the combustion chamber 712. The discharging gas flow path 714 is formed from the through hole 677 to the through hole 673 and also from the combustion chamber 712 through the coupling base section 656 to the through hole 673. The combustion fuel supplying flow path 716 is formed on the base section 652 from the through hole 674 to the through hole 676. The discharging chamber 718 is formed on a base section 652 as a rectangular concave section lowered than the stage 641 and a corner of the discharging chamber 718 connects to the through hole 671.

The reformer 400 is provided on the base section 654. As shown in FIG. 4, FIG. 8 and FIG. 9, the reformer 400 comprises the cup 410 whose bottom surface is open, a corrugating plate 420 accommodated in the cup 410 and a bottom plate 430 for closing the bottom opening of the cup 410.

The cup 410 includes a square or rectangular top plate 412, a pair of side plates 414, 414 connected perpendicular to the top plate 412 at two opposing sides among the four sides of the top plate 412, and a pair of side plates 416, 416 connected perpendicular to the top plate 412 at another two opposing sides of the top plate 412. The side plate 414 is connected perpendicular to the side plate 416 and the four side plates 414, 414, 416, 416 are provided in a square frame shape or a rectangular frame shape.

The end of the bottom plate 430 is joined to the bottom sides of the side plates 414, 414, 416, 416 so that the bottom plate 430 and the top plate 412 are parallel. As described above, closing the bottom opening of the cup 410 with the bottom plate 430 forms a parallel hexahedron shaped box with a hollow center.

The corrugated plate 420 comprises a plate including kovar (NiFeCo alloy) meandering in a corrugated shape, and includes a pair of opposing reinforcing sections 422, 422 on both ends of the plate, a plurality of partition sections 424, 424, ... opposing the reinforcing section 422 between the two reinforcing sections 422, 422, and a plurality of folded sections 426, 426 ... connected between the partition section 424 and the partition section 424 adjacent to each other at one side among the four sides of the partition section 424 or between adjacent partition section 424 and reinforcing section 422.

The corrugated plate 420 is accommodated in the cup 410 so that the wave peak direction is parallel to the side plate 414, and the reinforcing sections 422 of the corrugated plate 420 abut and face with the side plates 414, and preferably the reinforcing sections 422 are joined to the side plates 414 by brazing. Consequently, the reinforcing sections 422 function as reinforcing members to reinforce the side plates 414 of the cup 410. Thus, even when stress is put on the side plates 414, the structure is not easily deformed.

The folded sections 426 of the corrugated plate 420 abut and face with the side plates 416, and preferably the folded sections 426 are joined to the side plates 416 by brazing. Consequently, the folded sections 426 function as reinforcing members to reinforce the side plates 416 of the cup 410. Thus, even when stress is put on the side plates 416, the structure is not easily deformed.

The top side of the folded section 426 and the top side of the reinforcing section 422 abut the top plate 412 of the cup 410, and preferably they are joined by brazing. The bottom side of the folded section 426 and the bottom side of the reinforcing section 422 abut the bottom plate 430, and preferably they are joined by brazing.

As described above, the corrugated plate 420 is accommodated in the cup 410, thus the hollow center by the cup 410 and the bottom plate 430 is partitioned by the partition section 424 into a plurality of spaces 418, 418 and so on. Among the plurality of spaces 418, 418 ..., an introducing opening 432, which is connected to one space 418 between the reinforcing section 422 and the partition section 424, is formed on the bottom plate 430 and a discharging opening 434, which is connected to the other space 418 between the reinforcing section 422 and the partition section 424, is formed on the bottom plate 430.

A pair of top and bottom through holes 428, 428 is formed on one end of the partition section 424 in the direction of the wave peak and adjacent spaces 418, 418 are connected through the through holes 428, 428. Thus a flow path shape is provided in the hollow center of the cup 410 and the bottom plate 430 from the introducing opening 432 to the discharging opening 434 and the flow path is in a meandering shape.

As shown in FIG. 1 and FIG. 3, the bottom plate 430 of the reformer 400 is joined to the stage 643 positioned on the top surface of the base section 654. The bottom plate 430 covers a portion of the reforming fuel supplying flow path 702, a portion of the discharging gas flow path 714, a portion of the combustion fuel supplying flow path 710, a portion of the communicating flow path 704 and the combustion chamber 712. The introducing opening 432 formed on the bottom plate 430 is placed on the end 703 of the reforming fuel supplying flow path 702 and the discharging opening 434 formed on the bottom plate 430 is placed on the end 705 of the communicating flow path 704.

In the reformer 400, a reforming catalyst (for example Cu/ZnO-type catalyst or Pd/ZnO-type catalyst) is supported on the inner surface of the cup 410 and the bottom plate 430 and the corrugated plate 420.

The carbon monoxide remover 500 is provided on the base section 652. The carbon monoxide remover 500 comprises a cup 510 whose bottom surface is open, a separating plate 550 partitioning a top and bottom space accommodated in the cup 510, a bottom plate 530 covering the bottom opening of the cup 410, a corrugated plate 520 accommodated in the upper space of the two spaces partitioned by the separating board 550 and a corrugated plate 540 accommodated in the lower space thereof.

It is preferable that the cups 410, 510, the corrugated plates 420, 520, 540 and the bottom plate 430, 530 include kovar (NiFeCo alloy). It is preferable that the linear expansion coefficient of the electric insulating material which forms the later described insulating plate 640 is 70% to 130% and it is more preferable that it is 90% to 110%.

The cup 510 includes a square or rectangular top plate 512, a pair of side plates 514, 514 connected perpendicular to the top plate 512 from two opposing sides among the four sides of the top plate 512, and a pair of side plates 516, 516 connected perpendicular to the top plate 512 from another two opposing sides of the top plate 512. The side plates 514 are connected perpendicular to the side plates 516.

The end of the bottom plate 530 is joined to the bottom sides of the side plates 514, 514, 516, 516 so that the bottom plate 530 and the top plate 512 are parallel and forms a parallel hexahedron shaped box with a hollow center. The separating plate 550 is accommodated in the cup 510 so as to be parallel with the bottom plate 530 and the top plate 512 and the end of the separating plate 550 are joined between the top and bottom of the side plates 514, 514, 516, 516.

The corrugated plate 520 comprises a plate including kovar (NiFeCo alloy) meandering in a corrugated shape, and includes a pair of opposing reinforcing sections 522, 522 on both ends of the plate 520, a plurality of partition sections 524, 524, ... opposing the reinforcing section 522 between the two reinforcing sections 522, 522, and a plurality of folded sections 526, 526 ... connected between the partition section 524 and the partition section 524 adjacent to each other at one side among the four sides of the partition section 524 or between adjacent partition section 524 and reinforcing section 522.

The corrugated plate 540 is similar to the corrugated plate 520 and includes the same material and has a same shape. The corrugated plate 540 includes a pair of reinforcing sections 542, 542, a plurality of partition sections 544, 544 ... and a plurality of folded sections 546, 546 ....

The corrugated plate 520 is accommodated in a space between the separating plate 550 and the top plate 512, so that the wave peak direction is parallel to the side plate 514, and the reinforcing sections 522 of the corrugated plate 520 abut and face with the side plates 514, and preferably the reinforcing sections 522 are joined to the side plates 514 by brazing. Consequently, the reinforcing sections 522 function as reinforcing members to reinforce the side plates 514 of the cup 510. Thus, even when stress is put on the side plates 514, the structure is not easily deformed.

The folded sections 526 of the corrugated plate 520 abut and face with the side plates 516, and preferably the folded sections 526 are joined to the side plates 516 by brazing. Consequently, the folded sections 526 function as reinforcing members to reinforce the side plates 516 of the cup 510. Thus, even when stress is put on the side plates 516, the structure is not easily deformed.

The top side of the folded section 526 and the top side of the reinforcing section 522 abut the top plate 512 of the cup 510, and preferably they are joined by brazing. The bottom side of the folded section 526 and the bottom side of the reinforcing section 522 abut the separating plate 550, and preferably they are joined by brazing.

The corrugated plate 520 is accommodated in a space between the top plate 512 and the separating plate 550 in the cup 510, thus the space is partitioned by the partition section 524 into a plurality of spaces 518, 518 . . . .

The corrugated plate 540 is accommodated in a space between the separating plate 550 and the bottom plate 530, so that the wave peak direction is parallel to the side plate 514, and the reinforcing section 542 of the corrugated plate 540 abuts facing the side plate 514 and preferably the reinforcing section 542 is joined to the side plate 514 by brazing. The folded section 546 of the corrugated plate 540 abuts facing the side plate 516, and preferably the folded section 546 is joined to the side plate 516 by brazing.

The top side of the folded section 546 and the top side of the reinforcing section 542 abut the separating plate 550 of the cup 510, and preferably they are joined by brazing. The bottom side of the folded section 546 and the bottom side of the reinforcing section 542 abut the bottom plate 530, and preferably they are joined by brazing.

The corrugated plate 540 is accommodated in a space between the bottom plate 530 and the separating plate 550 in the cup 510, thus the space is partitioned by the partition section 544 into a plurality of spaces 519, 519 . . . . The lower corrugated plate 540 overlaps with the upper corrugated plate 520 with the separating plate 550 in between, and the upper space 518 is partitioned with the lower space 519 with the separating plate 550.

Through holes 528 are formed on the partitioning sections 524 and adjacent spaces 518, 518 are connected through the through holes 528. Similarly, through holes 548 are formed on the partitioning sections 544 and adjacent spaces 519, 519 are connected through the through holes 548. A plurality of through holes 552, 552, . . . are formed on the separating plate 550 and the spaces 518, 519 one above the other are connected through the through hole 552. The spaces 518, 518 . . . and the spaces 519, 519 . . . are in one predetermined flow path with the through holes 528, 548 and 552.

An introducing opening 532 is formed on the bottom plate 430 connecting to any of the plurality of spaces 519, 519 . . . , and a discharging opening 534 is formed on the bottom plate 530 connecting to another space 519.

As shown in FIG. 1 and FIG. 3, the bottom plate 530 of the carbon monoxide remover 500 is joined to the top surface of the base section 652. The bottom plate 530 covers a portion of the reforming fuel supplying flow path 702, a portion of the discharging gas flow path 714, a portion of the combustion fuel supplying flow path 710, a portion of the communicating flow path 704, the air supplying flow path 706, the mixing chamber 708, the combustion fuel supplying flow path 716, and the discharging chamber 718. The introducing opening 532 formed on the bottom plate 530 is placed on the corner 709 of the mixing chamber 708 and the discharging opening 534 formed on the bottom plate 530 is placed on the corner 719 of the discharging chamber 718.

In the carbon monoxide remover 500, the inner surface of the cup 510 and the bottom plate 530, the corrugated plate 520, the corrugated plate 540, and the separating plate 550 are supported with a carbon monoxide selective oxidation catalyst (for example, platinum, etc.).

As shown in FIG. 3, the bottom plate 430 of the reformer 400 and the bottom plate 530 of the carbon monoxide remover 500 are formed integrally coupled with a coupling cover 680. The plate material 690 which integrates the bottom plate 430, the bottom plate 530 and the coupling cover 680 is constricted at the coupling cover 680. The plate material 690 is joined to the base plate 642, where the coupling cover 680 of the plate material 690 is joined to the coupling base section 656 of the base plate 642 to form the coupling section 608. In the coupling section 608, a portion of the reforming fuel supplying flow path 702, a portion of the discharging gas flow path 714, a portion of the combustion fuel supplying flow path 710 and a portion of the communicating flow path 704 are covered with the coupling cover 680.

As shown in FIG. 1, etc., the external form of the coupling section 608 is prism-shaped, the width of the coupling section 608 is smaller than the width of the high temperature reactor 604 and the width of the low temperature reactor 606 and the height of the coupling section 608 is lower than the height of the high temperature reactor 604 and the low temperature reactor 606. Consequently, the difference of the appropriate temperature of the high temperature reactor 604 and the appropriate temperature of the low temperature reactor 606 can be maintained, and the heat loss of the high temperature reactor 604 can be suppressed as well as the temperature of the low temperature reactor 606 rising to a predetermined temperature or higher can be prevented. The coupling section 608 is provided between the high temperature reactor 604 and a low temperature reactor 606. The coupling section 608 is coupled to the high temperature reactor 604 at the central portion in a width direction of the high temperature reactor 604 and is coupled to the low temperature reactor 606 at the central portion in a width direction of the low temperature reactor 606. Consequently, the stress on the coupling section 608 based on the difference in heat expansion caused by the difference between the appropriate temperature of the high temperature reactor 604 and the appropriate temperature of the low temperature reactor 606 is suppressed to a minimum, and the leakage of the fluid from the coupling section 608 can be prevented. However, the coupling section 608 is small, thus it does not have the stiffness sufficient enough against the stress.

As described above, the reforming fuel supplying flow path 702, the communicating flow path 704, the combustion fuel supplying flow path 710 and the discharging gas flow path 714 is provided in the coupling section 608.

Figure 10:
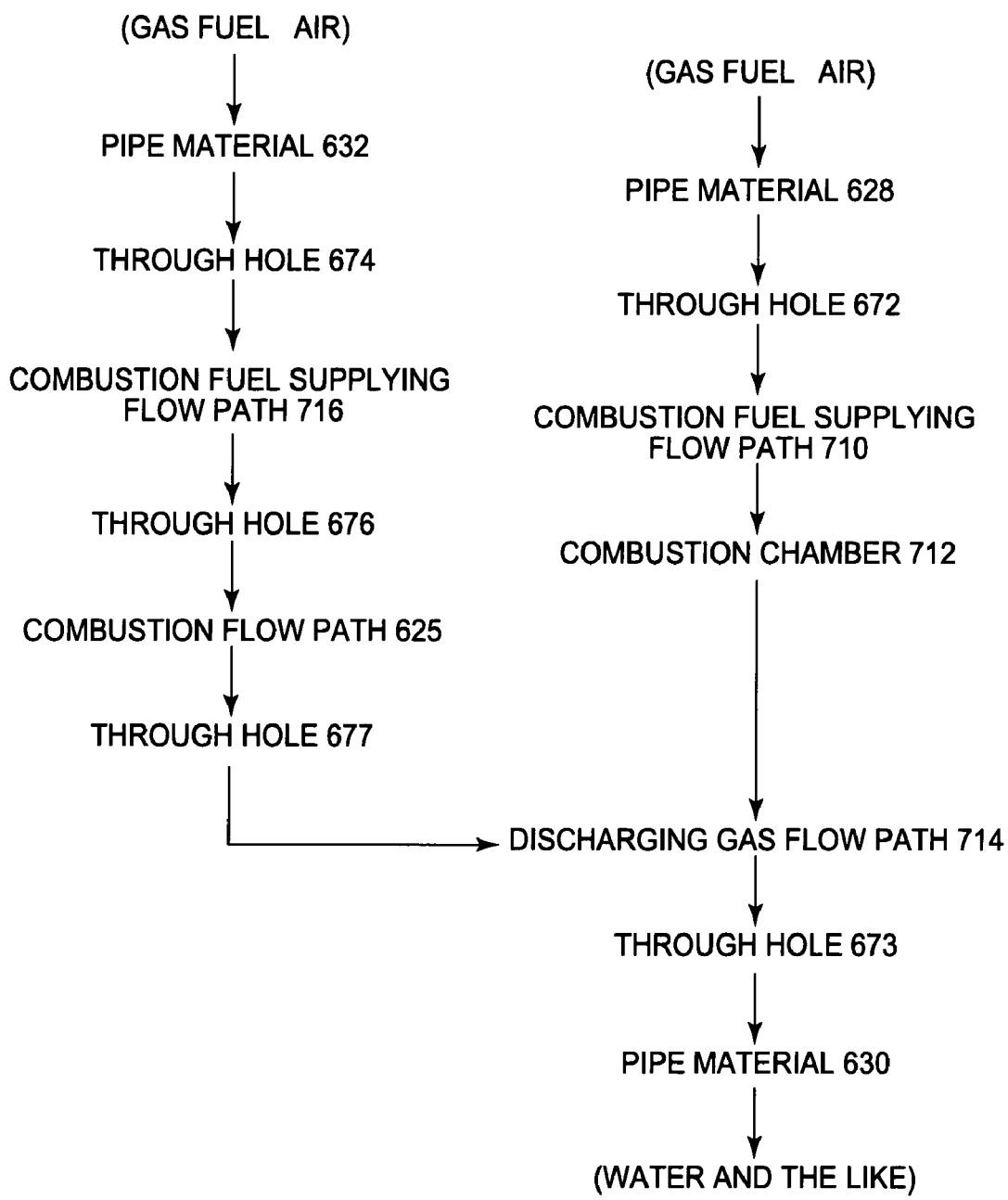
FIG. 10 is a diagram showing a flow path of how a product such as water, etc. is discharged after a combusted gas mixture is supplied.
Figure 11:
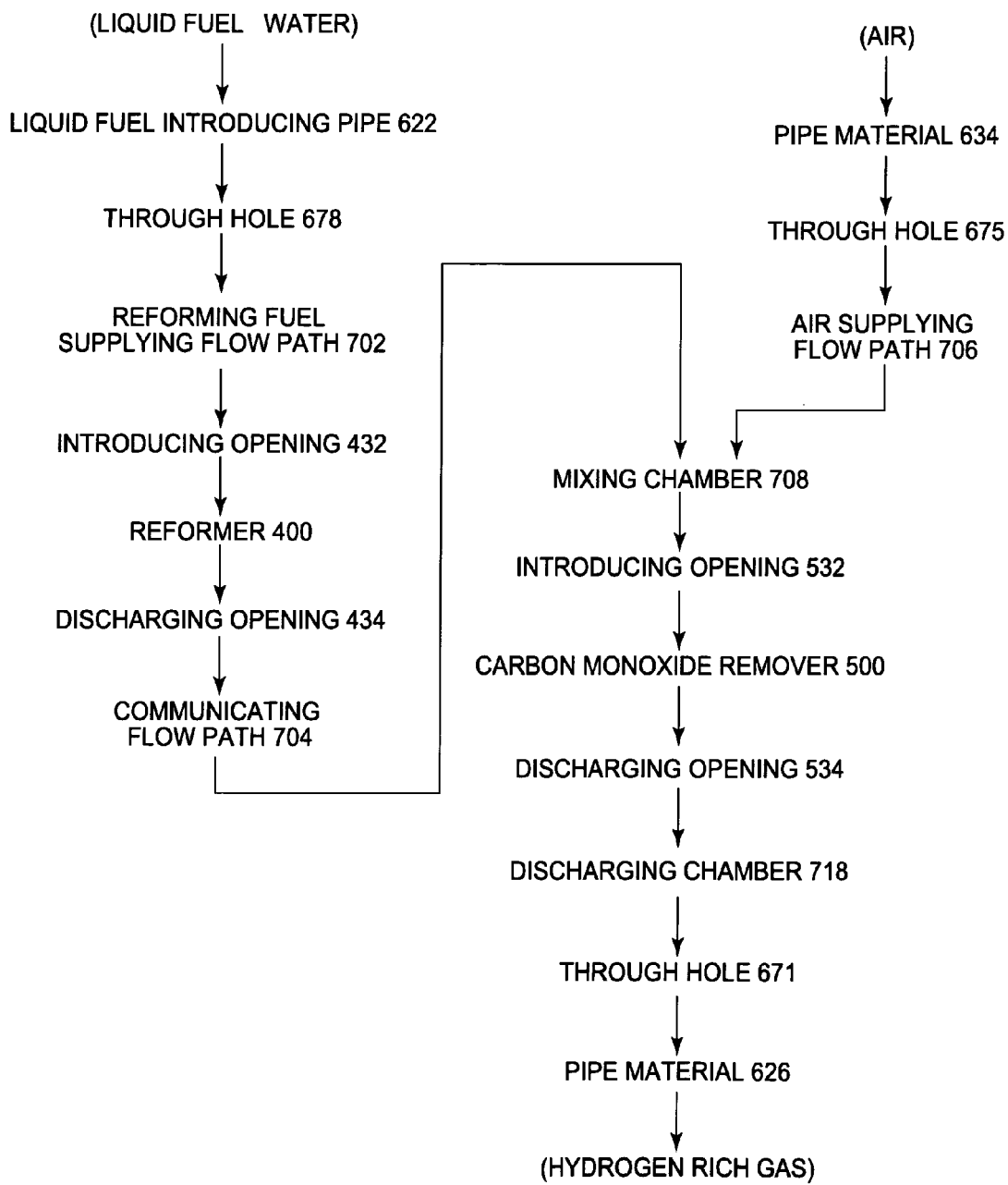
FIG. 11 is a diagram showing a flow path of how a product such as hydrogen gas is discharged after liquid fuel and water are supplied.

The route of the flow path provided inside the pipe group 602, the high temperature reactor 604, the low temperature reactor 606 and the coupling section 608 is as shown in FIG. 10 and FIG. 11. To explain the relation between FIG. 10, FIG. 11 and FIG. 2, the liquid fuel introducing pipe 622 corresponds to the vaporizer 610, the combustion flow path 625 corresponds to the first combustor 612, and the combustion chamber 712 corresponds to the second combustor.

As shown in FIG. 3, an electrical heating wire 720 is patterned in a meandering state on the bottom surface of the low temperature reactor 606, in other words the bottom surface of the insulating plate 640, and the electrical heating wire 722 is patterned in a meandering state on these bottom surfaces from the low temperature reactor 606 through the coupling section 608 to the high temperature reactor 604. An electrical heating wire 724 is patterned from the bottom surface of the low temperature reactor 606 through the surface of the combustor plate 624 to the side surface of the liquid fuel introducing pipe 622. Here, an insulating film such as silicon nitride, silicon oxide, etc., is formed on the side surface of the liquid fuel introducing pipe 622 and the surface of the combustor plate 624, and the electrical heating wire 724 is formed on the surface of the insulating film. By patterning the electrical heating wires 720, 722, 724 on the insulating film or the insulating plate 640, the applied voltage is hardly applied to the base plate 642, the liquid fuel introducing pipe 622 and the combustion plate 624 which are all made from metallic material, and the voltage is supplied to the electrical heating wires 720, 722, 724, thus enhancing the heat generation efficiency of the electrical heating wires 720, 722, 724.

The electrical heating wires 720, 722, 724 include laminated layers of an adhesion layer, a diffusion prevention layer and a heat generation layer in this order from the insulating plate 640. The heat generation layer includes a material with the lowest resistivity among the three layers (for example, Au), and when the voltage is applied to the electrical heating wires 720, 722, 724, a current intensively passes and generates heat. In the diffusion prevention layer, it is preferable to use a material with a relatively high melting point and low reactivity (for example W) so that the material of the heat generating layer does not diffuse to the diffusion prevention layer and the adhesion layer. The adhesion layer is used when the adhesion of the diffusion prevention layer to the insulating plate 640 is not high, and includes a material which has high adhesion to both the diffusion prevention layer and the insulating plate 640 (for example, Ta, Mo, Ti, Cr). The electrical heating wire 720 heats the low temperature reactor 606 at start-up, the electrical heating wire 722 heats the high temperature reactor 604 and the coupling section 608 at start-up, and the electrical heating wire 724 heats the vaporizer 502 of the pipe group 602 and the first combustor 612. Then, the offgas including the residual hydrogen which was not used in the electrochemical reaction is discharged from the fuel cell which generates power with the hydrogen gas discharged from the micro-reactor module 600. When the offgas is introduced to the second combustor 614 and combusted, the electrical heating wire 722 heats the high temperature reactor 604 and the coupling section 608 as a supplement to the second combustor 614. Similarly, when the offgas including hydrogen from the fuel cell is combusted in the first combustor 612, the electrical heating wire 720 and the electrical heating wire 724 heat the low temperature reactor 606 and the pipe group 602 as a supplement to the first combustor 612.

Since the electrical resistivity of the electrical heating wires 720, 722, 724 vary according to the change in temperature, the wires function as a temperature sensor where a temperature can be read from a resistance value to a specific applied voltage or current. Specifically, the temperature of the electrical heating wires 720, 722, 724 are proportional to the electrical resistivity.

The ends of the electrical heating wires 720, 722, 724 are positioned on the bottom surface of the low temperature reactor 606 and these ends are arranged to surround the combustor plate 624. Lead wires 731, 732 are respectively connected to both ends of the electrical heating wire 720, lead wires 733, 734 are respectively connected to both ends of the electrical heating wire 722, and lead wires 735, 736 are respectively connected to both ends of the electrical heating wire 724. In FIG. 1, in order to facilitate visualization, the illustrations of the electrical heating wires 720, 722, 724 and the lead wires 731 to 736 are omitted.

Figure 12:
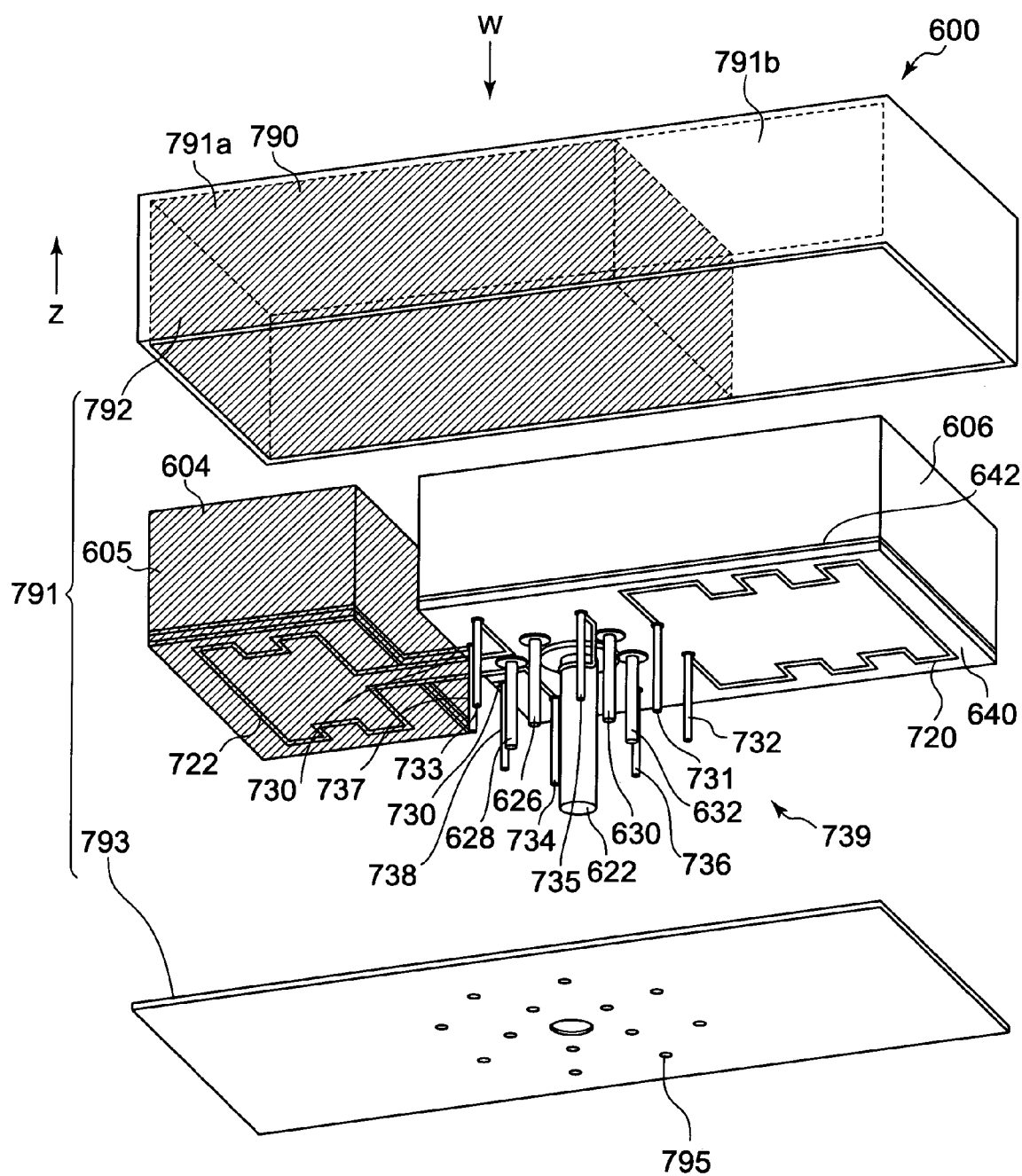
FIG. 12 is a perspective view showing a heat insulating package 791 in an exploded state.
Figure 13:
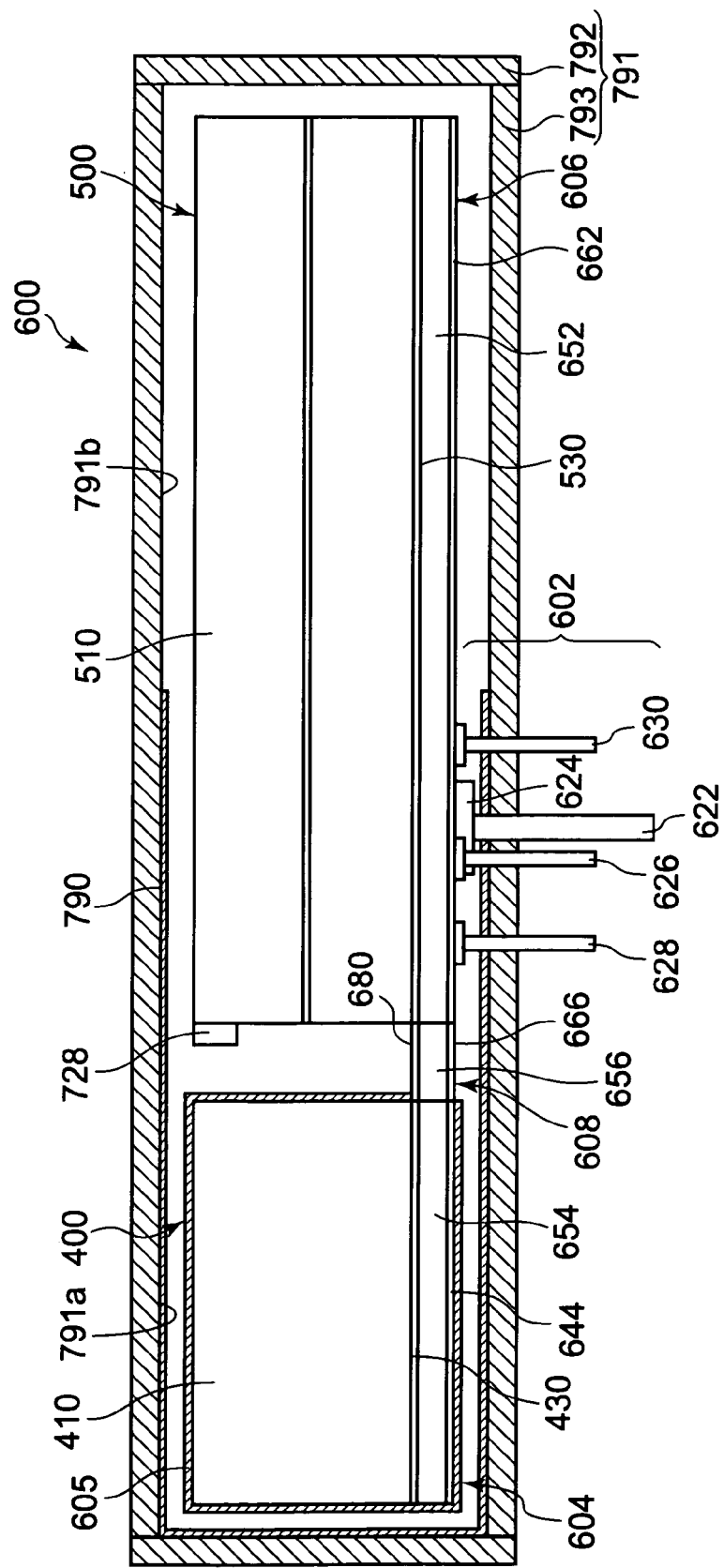
FIG. 13 is a sectional side view showing the heat insulating package 791 of FIG. 12 in a constructed state.

As shown in FIG. 12 and FIG. 13, the infrared reflectance of the high temperature reactor 604 of the micro-reactor module 600 is higher than the infrared reflectance of the low temperature reactor 606.

Specifically, an infrared reflecting film 605 with a higher infrared reflectance than the surface of the low temperature reactor 606 is provided on the surface of the high temperature reactor 604. As a material with high infrared reflectance for example, Au, ITO nanoparticles, etc. may be included, and such infrared reflecting film 605 is formed by coating the surfaces (top surface, bottom surface, and side surface) of the high temperature reactor 604. Specifically, the infrared reflecting film 605 is provided on the top surface and the side surface of the cup 410 including the high temperature reactor 604, and the bottom surface and the side surface of the base section 654 of the base plate 642.

Figure 14:
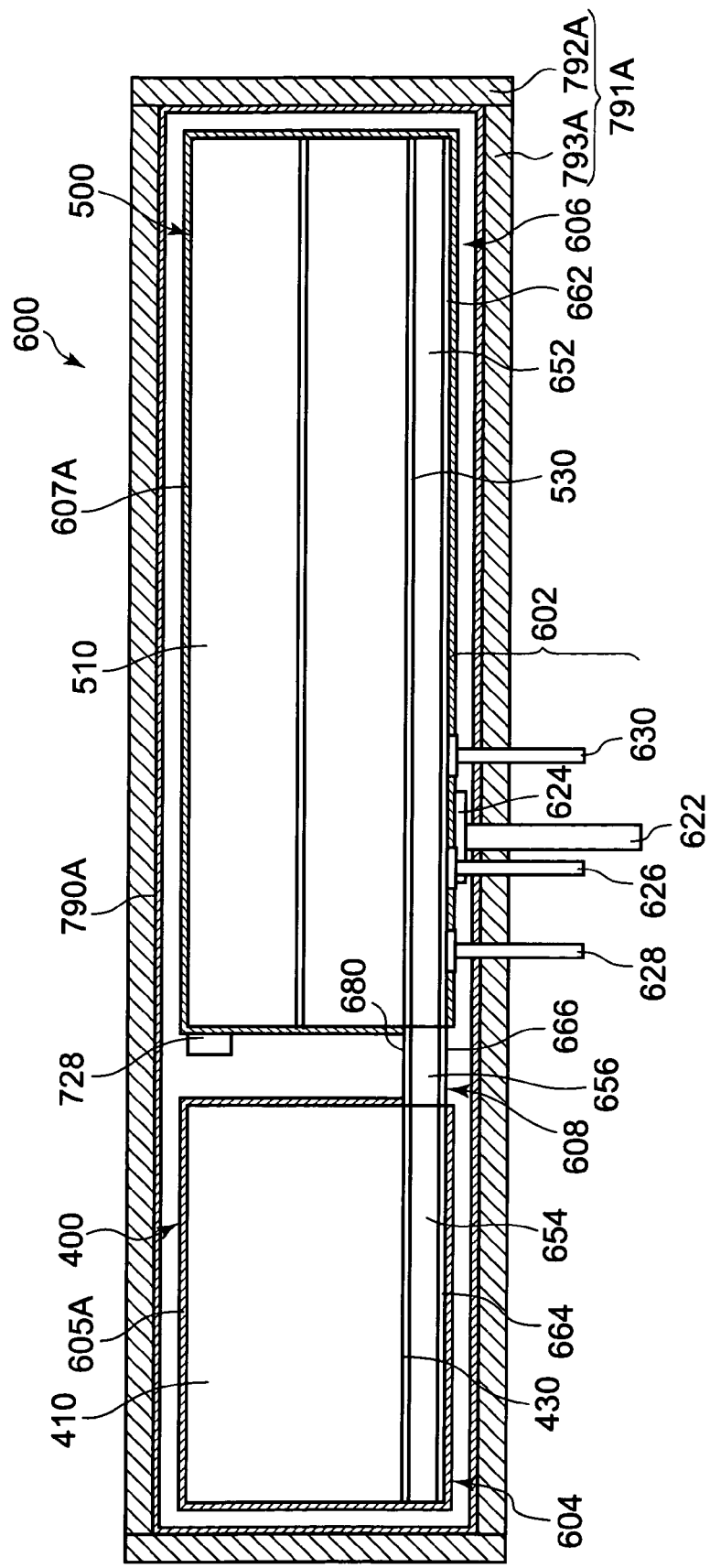
FIG. 14 is a sectional side view showing a heat insulating package 791A which is a modification.

As shown in FIG. 14, an infrared reflecting film 605A may be provided on the surface of the high temperature reactor 604, and an infrared reflecting film 607A with a lower infrared reflectance than the infrared reflecting film 605A may be provided on the surface of the low temperature reactor 606. As a material with low infrared reflectance, for example Al or material coated with black coating may be included, and the infrared reflecting film 607A is also formed by coating the surfaces (top surface, bottom surface and side surface) of the low temperature reactor 606. Specifically, the infrared reflecting film 607A is provided on the top surface and side surface of the cup 510 including the low temperature reactor 606 and the bottom surface and the side surface of the base section 652 of the base plate 642. In FIG. 14, the same reference numerals are applied to the structures similar to those shown in FIG. 13.

Also, the infrared reflecting film with a low infrared reflectance may be provided only on the low temperature reactor 606 without providing the infrared reflecting film on the surface of the high temperature reactor 604 (not shown).

As described above, as shown in FIG. 12 and FIG. 13, the micro-reactor module 600 comprising a high temperature reactor 604 and a low temperature reactor 606 with a different infrared reflectance includes a heat insulating package 791, and the high temperature reactor 604, the low temperature reactor 606 and the coupling section 608 are accommodated in the heat insulating package 791. The heat insulating package 791 comprises a rectangular case 792 whose bottom surface is open and a plate 793 for closing the opening of the bottom surface of the case 792 and the plate 793 is joined to the case 792. Both the case 792 and the plate 793 include an alloy plate such as stainless steel (SUS 304), etc.

The heat insulating package 791 reflects heat radiation from the pipe group 602, the high temperature reactor 604, the low temperature reactor 606 and the coupling section 608 and suppresses the propagation to the outside of the heat insulating package 791.

As shown in FIG. 13, in order to prevent the heat loss due to radiation from the high temperature reactor 604, the low temperature reactor 606, the coupling section 680, etc., an infrared reflecting film 790 for reflecting infrared rays is provided on the inner wall surface of the case 792 of the heat insulating package 791 and the top surface of the plate 793. The infrared reflecting film 790 suppresses the heat loss to the outside of the heat insulating package 791. Material for the infrared reflecting film 790 includes, for example, Al, Au, etc.

It is preferable the infrared reflecting film 790 is formed on the inner wall surface 791a facing to the high temperature reformer 604 of the heat insulating package 791, so that the infrared reflectance becomes higher compared to the inner wall surface 791b facing to the low temperature reformer 606. Specifically, by providing the infrared reflecting film 790 on all surfaces of the inner wall surface 791a facing to the high temperature reactor 604 of the heat insulating package 791 and only a portion (near the high temperature reactor 604) of the inner wall surface 791b facing to the low temperature reactor 606, the infrared reflectance between the high temperature reactor 604 side and the low temperature reactor 606 side of the heat insulating package 791 is different.

As shown in FIG. 14, the infrared reflecting film 790A may be provided on all surfaces of the inner wall surface of the heat insulating package 791A (inner wall surface of the case 792A and the top surface of the plate 793A).

In the above-described FIG. 13, the infrared reflecting film 790 is provided only on a portion of the inner wall surface 791b facing to the low temperature reactor 606, however, the infrared reflecting film may not be provided at all on the inner wall surface 791b facing to the low temperature reactor 606 (not shown).

Also not shown, an infrared reflecting film with a different reflectance may be provided on the inner wall surface 791a facing to the high temperature reactor 604 and the inner wall surface 791b facing to the low temperature reactor 606 respectively so that the infrared reflectance of the inner wall surface 791a side becomes higher.

The inner space between the heat insulating package 791 and the micro-reactor module 600 is decompressed and evacuated so that the inner pressure of the heat insulating package 791 becomes no more than 1 Pa. The pipe material 634 of the pipe group 602 which is to be the discharging path for the hydrogen gas is exposed from the heat insulating package 791 and is connected to a fuel electrode of the later-described power generating cell 808. The liquid fuel introducing pipe 622 is connected to the fuel container 804 through the flow rate control unit 806.

A portion of the wire group 739 including lead wires 732, 731, 733, 734, 736, 735, 737, 738 is exposed from the heat insulating package 791. The liquid fuel introducing pipe 622 and the lead wires 732, 731, 733, 734, 736, 735, 737, 738 are joined to the base plate 793 of the heat insulating package 791 by metal brazing, glass material, or insulating sealing material so that a gap where outside air may enter into the heat insulating package 791 from an area exposed from the heat insulating package 791 and raise the inner pressure is not formed in the liquid fuel introducing pipe 622 and the lead wires 732, 731, 733, 734, 736, 735, 737, 738. The heat insulating package 791 is metallic and exhibits conductivity, however the lead wires 732, 731, 733, 734, 736, 735, 737, 738 are covered with an insulating material with a high melting point, thus there is no continuity between the lead wires 732, 731, 733, 734, 736, 735, 737, 738 and the heat insulating package 791. Since the inner pressure of the inner space of the heat insulating package 791 can be maintained at a low pressure, the medium which propagates the heat generated by the micro-reactor module 600 becomes lean, heat convection in the inner space can be suppressed and the heat retention effect is enhanced in the micro-reactor module 600.

In the sealed space of the heat insulating package 791, there is a coupling section 608 with a predetermined length between the high temperature reactor 604 and the low temperature reactor 606 of the micro-reactor module 600, however since the volume of the coupling section 608 is extremely small compared to the volume of the high temperature reactor 604 and the low temperature reactor 606, the propagation of heat by the coupling section 608 from the high temperature reactor 604 to the low temperature reactor 606 can be suppressed. Consequently, the temperature gradient necessary for reaction between the high temperature reactor 604 and the low temperature reactor 606 can be maintained and the temperature inside the high temperature reactor 604 and the low temperature reactor 606 may be easily evened.

A getter material 728 is provided on the surface of the low temperature reactor 606 to absorb and remove from the inner space of the heat insulating package 791 factors which raise the pressure of the inner space of the heat insulating package 791 such as, a fluid which may leak out from the micro-reactor module 600 over time, a fluid which generates from the micro-reactor module 600 over time, a portion of the outside air which remains when sufficient decompression and evacuation cannot be done when the case 792 and the base plate 793 are joined, or outside air which enters into the heat insulating package 791 over time. A heater such as an electrical heating material, etc., is provided in the getter material 728 and the heater is connected to a wire 730. Both ends of the wire 730 are positioned on the bottom surface of the base plate 642 around the combustor plate 624 and lead wires 737, 738 are respectively connected to each end of the wire 730. When the getter material 728 is heated, the material is activated to absorb. Material for getter material 728 includes, an alloy composed mainly of zirconium, barium, titanium, or vanadium. A portion of the lead wires 737 and 738 are exposed from the heat insulating package 791, and lead wires 737, 738 are joined to the base plate 793 of the heat insulating package 791 by metal, glass material, or insulating sealing material so that a gap is not formed where outside air may enter into the heat insulating package 791 from the exposed area and raise the inner pressure. As for the wire group 739, it is desirable that the distances between the lead wires are equally apart and they are placed around the liquid fuel introducing pipe 622. The thickness of the coupling section 608 and the heat insulating package 791 (case 792, plate 793) is 0.1 mm to 0.2 mm and has bendability unique to metal for opposing to stress on the surfaces of the heat insulating package 791.

A plurality of inserting holes 795 penetrate the plate 793 and pipe materials 626, 628, 630, 632, 634, liquid fuel introducing pipe 622 and lead wires 731 to 738 are inserted through the inserting holes 795 and the through holes 795 are sealed with a metal or glass material. The inner space of the heat insulating package 791 is sealed and the inner space is decompressed, thus the heat insulating effect is high. Therefore, the heat loss is suppressed.

The pipe material 626, 628, 630, 632, 634 and the liquid fuel introducing pipe 622 protrudes inside and outside the heat insulating package 791. Therefore, inside the heat insulating package 791, the pipe material 626, 628, 630, 632, 634 and liquid fuel introducing pipe 622 stand against the plate 793 as struts, the high temperature reactor 604, the low temperature reactor 606 and the coupling section 608 are supported by the pipe material 626, 628, 630, 632, 634 and the liquid fuel introducing pipe 622, and the high temperature reactor 604, the low temperature reactor 606, and the coupling section 608 are separated from the inner surface of the heat insulating package 791.

It is preferable that the liquid fuel introducing pipe 622 is connected to the bottom surface of the low temperature reactor 606 at the barycenter of the entire high temperature reactor 604, low temperature reactor 606 and the coupling section 608 in plan view.

If the liquid fuel introducing pipe 622, pipe group 602 and wire group 739 is provided in the high temperature reactor 604, since the high temperature reactor 604 needs to be maintained at a high temperature during operation, the temperatures of the liquid fuel introducing pipe 622, the pipe group 602 and the wire group 739 also become high, and the amount of heat which is transferred and lost from the liquid fuel introducing pipe 622, the pipe group 602, and the wire group 739 to the heat insulating package 200 becomes large. However, since the liquid fuel introducing pipe 622, the pipe group 602, and the wire group 739 are provided in the low temperature reactor 606, the amount of heat which is transferred and lost from the liquid fuel introducing pipe 622, the pipe group 602, and the wire group 739 to the heat insulating package 791 is small, and the amount of heat dissipated from an area of the liquid fuel introducing pipe 622, the pipe group 602, and the wire group 739 exposed outside the heat insulating package 791 is small. Consequently, the high temperature reactor 604 and the low temperature reactor 606 can be heated promptly, and it is easier to stably maintain a heating temperature.

The getter material 728 is provided on the surface of the low temperature reactor 606, however it is not limited to this position as long as the position where the getter material 728 is positioned is inside the heat insulating package 791.

Here, the top end of the pipe material 626, 628, 630, 632, 634 is shaped in a flange shape, and the flange portion is fixed to the base plate 662 which is the bottom surface of the low temperature reactor 606. Similar to the low temperature reactor 606, the base plate 662 is heated to 120° C. to 200° C., more preferably to 140° C. to 180° C., the heat insulating package 791 is heated to about 80° C., and a difference in temperature of several tens of ° C. between the base plate 642 and the heat insulating package 791 occurs.

Next, the operation of the micro-reactor module 600 will be described. First, when the voltage is applied to the lead wires 737, 738, the getter material 728 is heated by the heater and the getter material 728 is activated. With this, the factor which raises the pressure such as gas inside the heat insulating package 791 is absorbed by the getter material 728, the decompression amount inside the heat insulating package 791 is raised and the heat insulating efficiency is enhanced.

When the voltage is applied to the lead wires 731, 732, the electrical heating wire 720 generates heat and the low temperature reactor 606 is heated. When the voltage is applied to the lead wires 733, 734, the electrical heating wire 722 generates heat and the high temperature reactor 604 is heated. When the voltage is applied to the lead wires 735, 736, the electrical heating wire 724 generates heat and the top portion of the liquid fuel introducing pipe 622 is heated. The liquid fuel introducing pipe 622, the high temperature reactor 604, the low temperature reactor 606 and the coupling section 608 include metallic material, thus heat easily transfers between these sections. By measuring the current and voltage of the electrical heating wires 720, 722, 724 with a control apparatus, the temperatures of the liquid fuel introducing pipe 622, the high temperature reactor 604, and the low temperature reactor 606 are measured, and the measured temperature is fed back to the control apparatus. The control apparatus controls the voltage of the electrical heating wire 720, 722, 724 so that the temperatures of the liquid fuel introducing pipe 622, the high temperature reactor 604, and the low temperature reactor 606 is controlled.

When the liquid fuel introducing pipe 622, the high temperature reactor 604 and the low temperature reactor 606 are heated by the electrical heating wires 720, 722, 724, and a liquid mixture of liquid fuel and water is supplied to the liquid fuel introducing pipe 622 continuously or intermittently with a pump, etc., the liquid mixture is absorbed by a liquid absorbing material 623, and the liquid mixture permeates upward toward the inside of the liquid fuel introducing pipe 622 by capillary phenomenon. The liquid mixture is heated and vaporized in the liquid absorbing material 623 and a gas mixture of fuel and water evaporate from the liquid absorbing material. With the porous liquid absorbing material 623, evaporation occurs from a large number of fine liquid surfaces partitioned by fine holes. Consequently, since there is only a small amount of liquid mixture in each hole, even when an excess amount of heat is applied, a fixed quantity is stably evaporated without bumping.

The gas mixture evaporated from the liquid absorbing material 623 flows through the through hole 678, reforming fuel supplying flow path 702, and introducing opening 432 into the reformer 400. Then, while the gas mixture flows through the reformer 400, by heating the gas mixture and causing a catalytic reaction, hydrogen gas, etc. is generated (when the fuel is methanol, see the above chemical formulas (1) and (2)).

The gas mixture (including hydrogen gas, carbon dioxide gas, carbon monoxide gas, etc.) generated in the reformer 400 flows through the discharging opening 434 and the communicating flow path 704 into the mixing chamber 708. Air is supplied to the pump material 634 with a pump, etc., which flows through the through hole 675 and the air supplying flow path 706 into the mixing chamber 708 and the gas mixture such as hydrogen gas, etc., is mixed with air.

Then, the gas mixture including air, hydrogen gas, carbon monoxide gas, carbon dioxide gas, etc., flows from the mixing chamber 708 through the introducing opening 532 into the carbon monoxide remover 500. While the gas mixture flows through the carbon monoxide remover 500, the carbon monoxide gas in the gas mixture is selectively oxidized and the carbon monoxide gas is removed.

The gas mixture with the carbon monoxide removed is supplied from the discharging opening 534 through the discharging chamber 718, the through hole 671, the pipe material 626 to the fuel electrode, etc. of the fuel cell. In the fuel cell, the electrochemical reaction of the hydrogen gas generates power and the offgas including unreacted hydrogen gas, etc. is discharged from the fuel cell.

The above described operation is the operation of the early steps, then the liquid mixture is continuously supplied to the liquid fuel introducing pipe 622. Oxygen (air may also be used) is mixed in the offgas discharged from the fuel cell, and the gas mixture (hereinafter referred to as combustion gas mixture) is supplied to the pipe material 632 and the pipe material 628. The combustion gas mixture supplied to the pipe material 632 flows through the through hole 674, the combustion fuel supplying flow path 716, the through hole 676 to the combustion flow path 625 and the combustion gas mixture is catalytically combusted in the combustion flow path 625. This generates combustion heat and since the combustion flow path 625 circles the liquid fuel introducing pipe 622 on the bottom side of the low temperature reactor 606, the liquid fuel introducing pipe 622, that is the vaporizer 610 is heated by the combustion heat as well as the low temperature reactor 606. Consequently, the power consumption of the electrical heating wires 720, 724 can be reduced and the energy use efficiency can be enhanced.

The combustion gas mixture supplied to the pipe material 628 flows through the through hole 672, the combustion fuel supplying flow path 710 to the combustion chamber 712, and the combustion gas mixture is catalytically combusted in the combustion chamber 712. This generates combustion heat, and the combustion heat heats the reformer 400. Consequently, the power consumption of the electrical heating wire 722 can be reduced and the energy use efficiency can be enhanced.

Here, since the high temperature reactor 604 needs to be maintained at a higher temperature than the low temperature reactor 606, an amount of supply of hydrogen of the offgas per unit time in the second combustor 614 may be in a larger amount than an amount of supply of hydrogen of the offgas per unit time in the first combustor 612 or an amount of supply of oxygen (air) which is the refrigerant per unit time in the first combustor 612 may be in a larger amount than an amount of supply of oxygen (air) per unit time in the second combustor 614.

When the liquid fuel stored in the fuel container 804 is evaporated, the combustion gas mixture of the evaporated fuel and air may be supplied to the pipe materials 628, 632.

When the liquid mixture is supplied to the liquid fuel introducing pipe 622 and the combustion gas mixture is supplied to the pipe material 628, 632, while measuring the temperature of the electrical heating wires 720, 722, 724, the control apparatus controls the voltage applied to the electrical heating wires 720, 722, 724 as well as the pump, etc. When the control apparatus controls the pump, the flow rate of the combustion gas mixture supplied to the pipe material 628, 632 is controlled, and this controls the amount of combustion heat of the combustor 612, 614. As described above, the control apparatus controls the temperatures of the liquid fuel introducing pipe 622, the high temperature reactor 604 and the low temperature reactor 606 by controlling the electrical heating wires 720, 722, 724 and the pump. Here, the temperature is controlled so that the high temperature reactor 604 is 375° C. and the low temperature reactor 606 is 150° C.

If the difference of the linear expansion coefficient between the insulating plate 640 and the reacting container such as the cups 410, 510, the corrugated boards 420, 520, 540, the separating plate 550, the plate material 690, the base plate 642, etc., is large, as the temperature of the high temperature reactor 604 and the low temperature reactor 606 rises, heat stress is applied to a bonded area and a deformation such as warpage toward the lower linear expansion coefficient may occur. Particularly, since the heat insulating plate 640 is directly provided with electrical heating wires 720, 722, 724 and combustor plate 624 as heat sources, the temperature easily becomes high, which generates heat stress. In the present embodiment, the material is selected so that the linear expansion coefficient of the reacting container and the insulating plate 640 are close.

Figure 15:
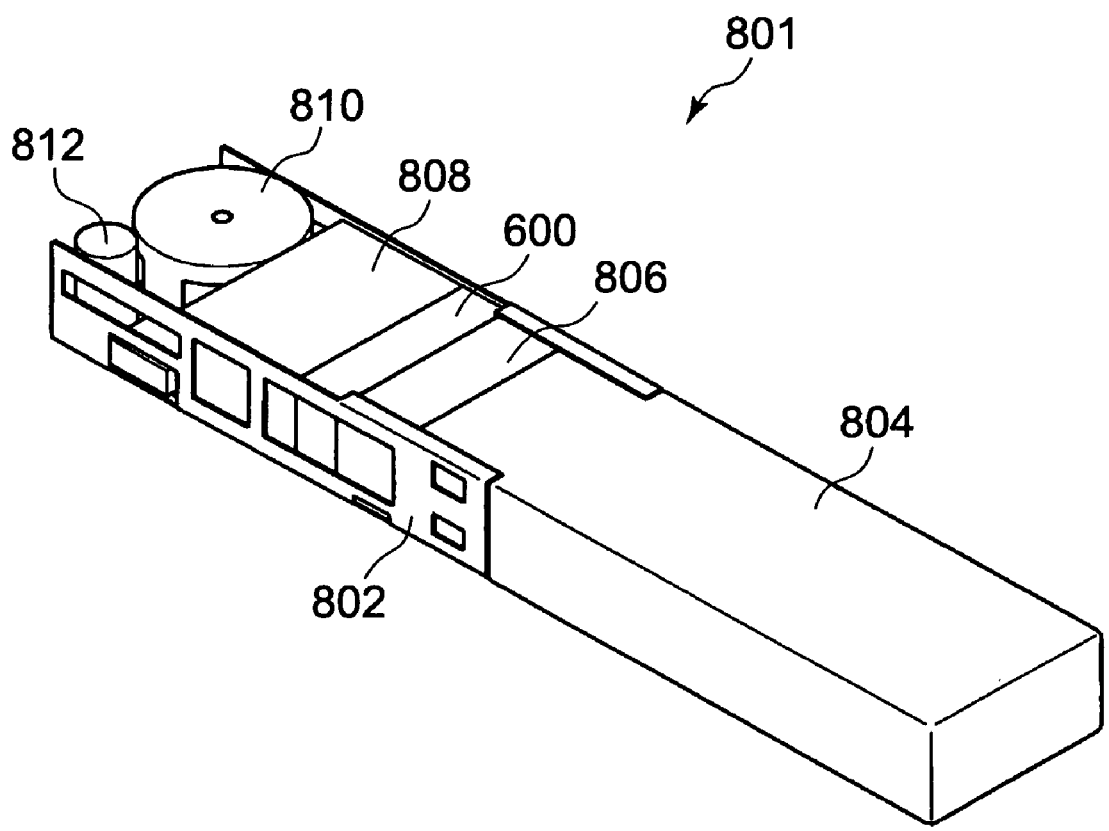
FIG. 15 is a perspective view showing a power generating unit 801.

As shown in FIG. 15, the above-described micro-reactor module 600 may be used with a power generating unit 801. FIG. 15 is a perspective view showing the power generating unit 801.

The power generating unit 801 comprises a frame 802, a fuel container 804 removably attached to the frame 802, a flow rate control unit 806 including a flow path, a pump, a flow rate sensor, a valve, etc., the micro-reactor module 600 accommodated in the heat insulating package 791, a power generating cell 808 including a fuel cell, a humidifier, a collector, etc., an air pump 810, and a power source unit 812 including a secondary cell, a DC-DC converter and an external interface. By supplying a gas mixture of water and liquid fuel in the fuel container 804 to the micro-reactor module 600, as described above, hydrogen gas is generated, the hydrogen gas is supplied to the fuel cell of the power generating cell 808 and the generated power is stored in the secondary cell of the power source unit 812.

Figure 16:
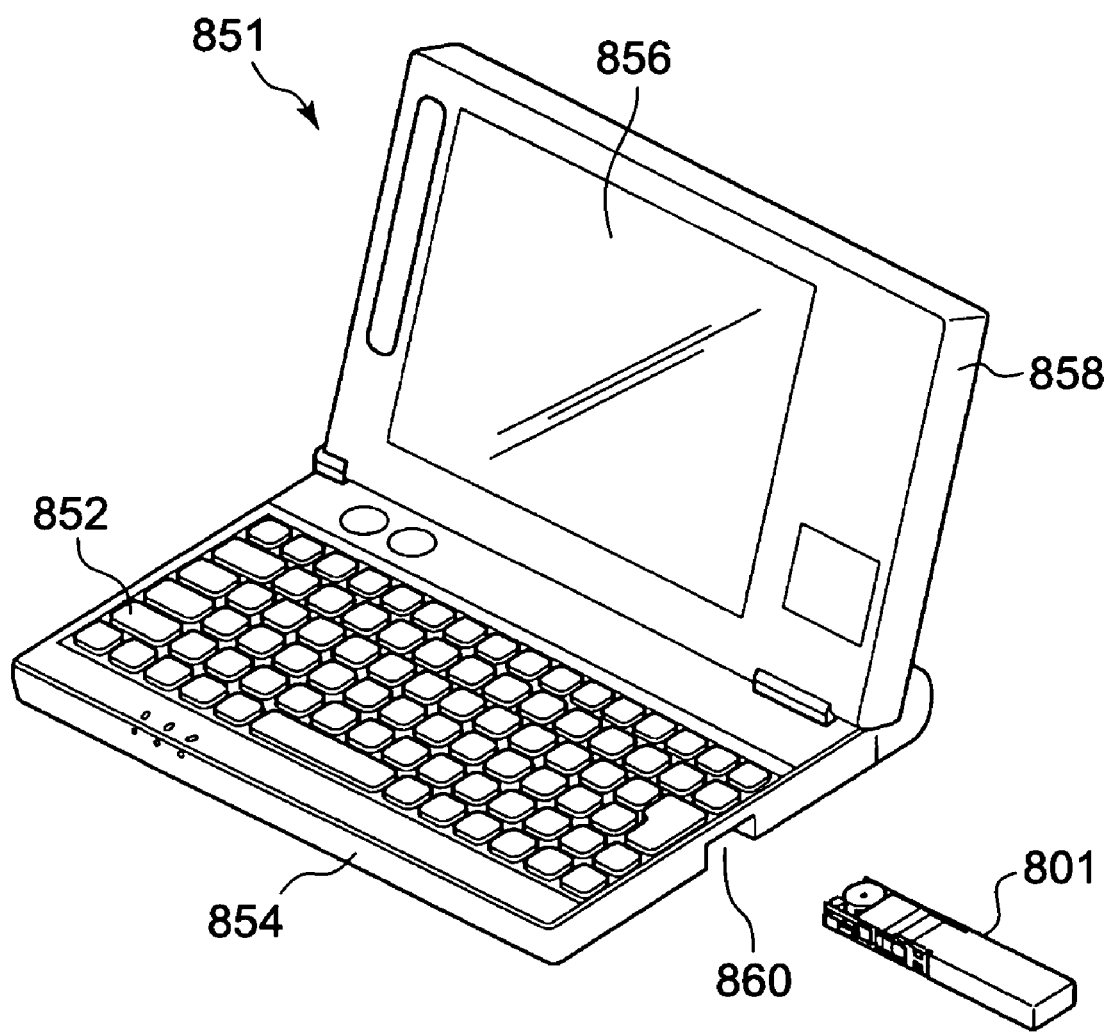
FIG. 16 is a perspective view showing an electronic device 851.

FIG. 16 is a perspective view showing an electronic device 851 using the power generating unit 801 as a power source. As shown in FIG. 16, the electronic device 851 is a portable electronic device, especially a laptop personal computer. The electronic device 851 comprises a lower box 854 with an internal processing circuit including a CPU, a RAM, a ROM, and other electronic parts as well as a keyboard 852, an upper box 858 with a liquid crystal display 856. The lower box 854 and the upper box 858 are joined with a hinge, and the upper box 858 and the lower box 854 may be folded so that the keyboard 852 and the liquid crystal display 856 overlap opposing each other. A concave attaching section 860 is provided from the right side surface to the bottom surface of the lower box 854 for attaching the power generating unit 801 and when the power generating unit 801 is attached to the attaching section 860, the electronic device 851 operates with the power from the power generating unit 801.

As described above, according to an embodiment of the present invention, since the infrared reflectance of the high temperature reactor 604 is higher then the infrared reflectance of the low temperature reactor 606, the radiation of the high temperature reactor 604 is prevented and the heat dissipation of the low temperature reactor 606 is promoted compared to the high temperature reactor 604. Consequently, the difference in temperature between the high temperature reactor 604 and the low temperature reactor 606 may be maintained.

Since the infrared reflecting film 605 with a high infrared reflectance is provided on the surface of the high temperature reactor 604 and the infrared reflecting film 607 with a low infrared reflectance is provided on the surface of the low temperature reactor 606, the difference in temperature between the high temperature reactor 604 and the low temperature reactor 606 may be easily maintained.

Among the inner wall surfaces of the heat insulating package 791, since the infrared reflectance of the inner wall surface 791*a* facing to the high temperature reactor 604 is lower than that of the inner wall surface 791*b* facing to the low temperature reactor 606, compared to the radiation heat from the low temperature reactor 606, the radiation heat from the high temperature reactor 604 is reflected by the inner wall surface 791*a* of the heat insulating package 791 and the heat loss may be reduced. In this way also the difference in temperature between the high temperature reactor 604 and the low temperature reactor 606 may be maintained.

When the infrared reflecting films 605, 607 are provided on either one of the high temperature reactor 604 or the low temperature reactor 606, the cost may be reduced.

The entire disclosure of Japanese Patent Application No. 2007-082105 on Mar. 27, 2007 including specification, claims, drawings and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A reacting apparatus comprising:
    a high temperature reactor which causes a reaction of a reactant;
    a low temperature reactor which is provided in a position facing the high temperature reactor, and which causes a reaction of a reactant at a lower temperature than the high temperature reactor;
    a coupling section which couples the high temperature reactor and the low temperature reactor at respective opposing faces, which oppose each other, of the high temperature reactor and the low temperature reactor;
    a heat insulating package which accommodates the high temperature reactor, the low temperature reactor, and the coupling section, wherein an inner space of the heat insulating package is decompressed; and
    an infrared reflecting film to reflect infrared rays, wherein the infrared reflecting film is provided on (i) a portion of an inner wall surface of the heat insulating package facing the high temperature reactor, (ii) a portion of the inner wall surface of the heat insulating package facing the coupling section, and (iii) only a part closer to the high temperature reactor of a portion of the inner wall surface of the heat insulating package facing the low temperature reactor.

2. The reacting apparatus according to claim 1, further comprising another infrared reflecting film, which has a higher infrared reflectance than a surface of the low temperature reactor, and which is provided on a surface of the high temperature reactor.

3. The reacting apparatus according to claim 1, further comprising another infrared reflecting film, which has a lower infrared reflectance than a surface of the high temperature reactor, and which is provided on a surface of the low temperature reactor.

4. The reacting apparatus according to claim 1, further comprising:
    another infrared reflecting film provided on a surface of the high temperature reactor; and
    a further infrared reflecting film, which has a lower infrared reflectance than said another infrared reflecting film, and which is provided on a surface of the low temperature reactor.

5. The reacting apparatus according to claim 2, wherein said another infrared reflecting film provided on the surface of the high temperature reactor comprises an Au film.

6. The reacting apparatus according to claim 3, wherein said another infrared reflecting film provided on the surface of the low temperature reactor comprises an Al film.

* * * * *